United States Patent
Jang et al.

(10) Patent No.: US 12,452,322 B2
(45) Date of Patent: Oct. 21, 2025

(54) INTEGRATING CHAT CHANNELS WITH DOCUMENT EDITING

(71) Applicant: Zoom Video Communications, Inc., San Jose, CA (US)

(72) Inventors: Youjin Jang, San Ramon, CA (US); Sheldon Lawrence Menezes, Seattle, WA (US); Robert Allen Ryskamp, Mountain View, CA (US); Adam Justin Spooner, Greensboro, NC (US); Matthew Brandon Wesson, Lafayette, CO (US)

(73) Assignee: Zoom Communications, Inc., San Jose, CA (US)

( * ) Notice: Subject to any disclaimer, the term of this patent is extended or adjusted under 35 U.S.C. 154(b) by 0 days.

(21) Appl. No.: 17/875,000

(22) Filed: Jul. 27, 2022

(65) Prior Publication Data
US 2024/0039969 A1    Feb. 1, 2024

(51) Int. Cl.
*H04L 65/401* (2022.01)
*H04L 51/04* (2022.01)

(52) U.S. Cl.
CPC .......... *H04L 65/4015* (2013.01); *H04L 51/04* (2013.01)

(58) Field of Classification Search
None
See application file for complete search history.

(56) References Cited

U.S. PATENT DOCUMENTS

| | | | | |
|---|---|---|---|---|
| 5,801,677 A | * | 9/1998 | Obata | G06F 3/0485 715/857 |
| 2007/0283278 A1 | * | 12/2007 | Hupfer | G06F 9/542 715/751 |
| 2008/0084984 A1 | * | 4/2008 | Levy | H04L 12/1818 379/202.01 |
| 2009/0216726 A1 | * | 8/2009 | Muthaiah | G06Q 30/04 |
| 2012/0278401 A1 | * | 11/2012 | Meisels | G06F 40/197 709/206 |
| 2013/0151624 A1 | * | 6/2013 | Bhogal | G06F 3/0484 709/205 |
| 2013/0159830 A1 | * | 6/2013 | Lee | G06F 40/137 715/208 |
| 2014/0101571 A1 | * | 4/2014 | Lewis | H04L 67/1044 715/753 |
| 2014/0129645 A1 | * | 5/2014 | Mo | G06Q 10/101 709/205 |
| 2016/0359929 A1 | * | 12/2016 | Edelstein | H04L 51/04 |
| 2017/0300483 A1 | * | 10/2017 | DeVincenzi | G06F 40/134 |
| 2020/0228580 A1 | * | 7/2020 | Choi | H04L 12/1822 |
| 2020/0382618 A1 | * | 12/2020 | Faulkner | H04L 65/403 |
| 2021/0194837 A1 | * | 6/2021 | Lane | H04L 51/10 |
| 2022/0201049 A1 | * | 6/2022 | Jamison | H04W 4/08 |
| 2022/0217304 A1 | * | 7/2022 | Gandhi | G06V 40/28 |
| 2022/0245331 A1 | * | 8/2022 | Xu | H04L 65/4015 |

(Continued)

*Primary Examiner* — Chris Parry
*Assistant Examiner* — Abderrahmen Chouat
(74) *Attorney, Agent, or Firm* — Kilpatrick Townsend & Stockton, LLP

(57) ABSTRACT

One example method includes establishing a chat channel; creating a shared document; associating the shared document and the chat channel; establishing access rights to the shared document and the chat channel for each user of a plurality of identified users; and providing the chat channel and the shared document to each user of the plurality of identified users.

11 Claims, 16 Drawing Sheets

(56) References Cited

U.S. PATENT DOCUMENTS

| | | | | |
|---|---|---|---|---|
| 2022/0263675 A1* | 8/2022 | Cupala | ............... | H04L 65/4015 |
| 2023/0214780 A1* | 7/2023 | Fong | ................... | G06Q 10/103 |
| | | | | 705/7.18 |
| 2023/0353651 A1* | 11/2023 | Maurer | .................. | H04L 67/54 |

* cited by examiner

INTEGRATING CHAT CHANNELS WITH DOCUMENT EDITING

FIELD

The present application generally relates to chat channels and shared documents, but more particularly relates to integrating chat channels with document editing.

BRIEF DESCRIPTION OF THE DRAWINGS

The accompanying drawings, which are incorporated into and constitute a part of this specification, illustrate one or more certain examples and, together with the description of the example, serve to explain the principles and implementations of the certain examples.

DETAILED DESCRIPTION

Figure 1:
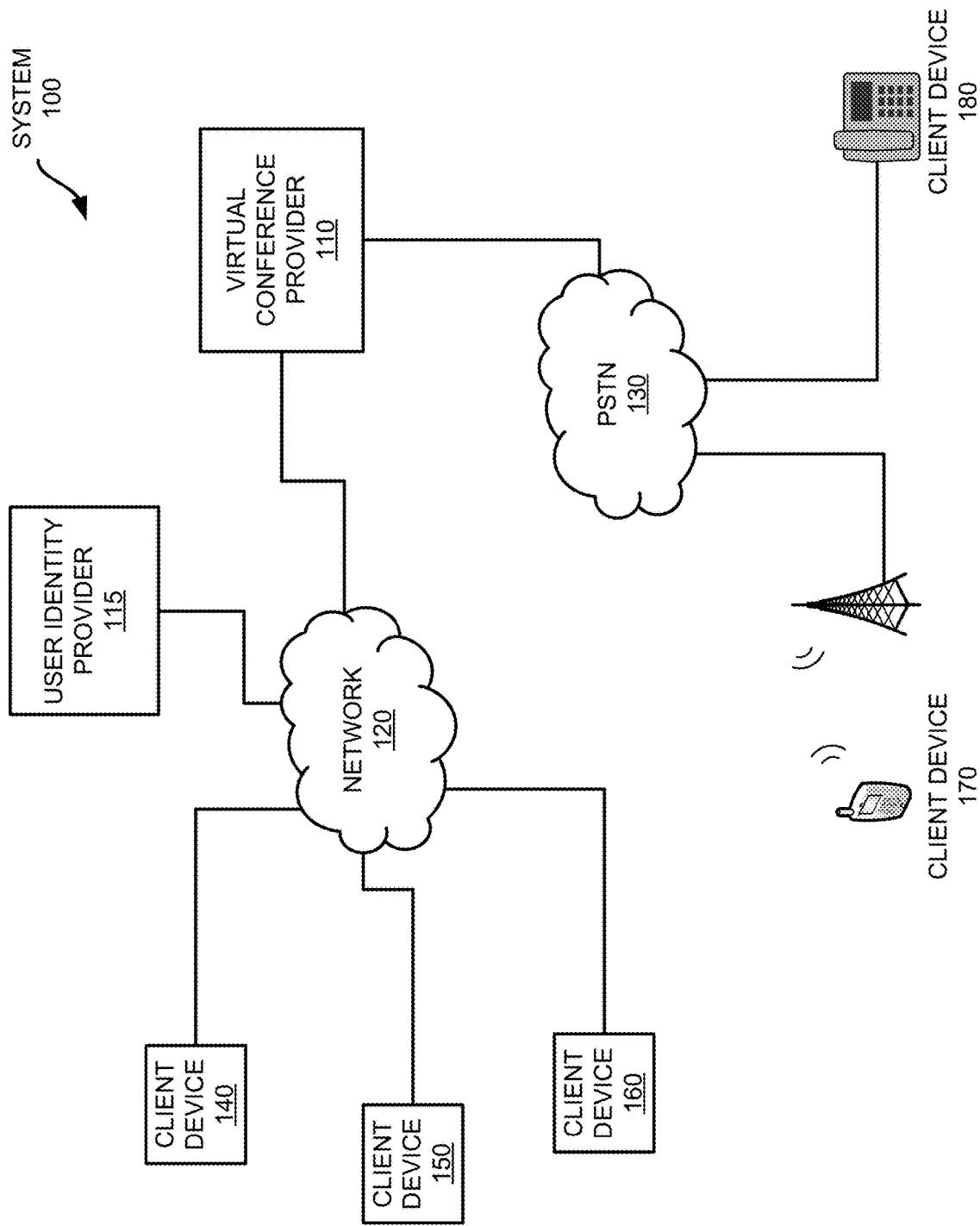
FIGS. 1-2 show example systems for integrating chat channels with document editing.

Examples are described herein in the context of integrating chat channels with document editing. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

As a part of working on various teams, people may collaborate when creating and editing documents. For example, engineering teams may jointly develop design documents or specifications, marketing teams may generate presentations or product mockups, and management teams may create roadmaps or business strategies or goals. While collaboration on the documents themselves is an integral part of these efforts, the various team members also communicate outside of the documents they are working on. While email and instant messaging are commonly available communication options, they are often inefficient because email communications can be difficult to organize and track, while instant messages are frequently one-to-one communications and may or may not provide a message history over time. Instead, team members may create chat channels within which they can post messages and maintain a running conversation without the headaches of email or monitoring multiple different instant message conversations.

However, conventionally, chat channels and documents exist independently of each other. Users may create and modify documents using an application or via an online tool. Similarly, they may access separate chat functionality to discuss various relevant information, which may include discussion about various documents the users are collaborating on. However, these two functionalities—document editing and chatting—are independent of each other. Thus, the users need to separately track discussions in the chat and progress on the various documents.

To help improve team collaboration when working with online documents, a virtual conference provider can provide integrated chat and document editing functionality. To do so, the virtual conference provider creates a new chat channel when a new document is created, or if a chat channel is created, the virtual conference provider generates a corresponding document. Thus, a chat channel always has a corresponding document, and similarly, a document always has a corresponding chat channel. This can enable integration between document editing activities and the chat channel.

For example, after creating a new document, a corresponding chat channel is created and the document creator is added as a member of the chat channel. The document creator can then invite other people into the chat channel or to edit the document, which also causes them to be invited to both the chat channel and the document. Editing and chat permissions are then assigned to the added users and each of the users can engage with chats within the chat channel and similarly edit or comment on the document.

To help tightly integrate chat with the document, the chat channel can provide updates to the other members of the chat channel when edits are made to the document or when comments are added. The updates may identify who has edited the document and may provide an interactive link to jump to the relevant portion of the document. Similarly, if one or more comments are added to the document, they may be simultaneously posted into the chat channel for the various members to view. As with the modification notifications, members of the chat channel may be able to select the comments within the chat channel to jump to the corresponding comment within the document. Moreover, content added to the chat channel may be inserted into the document.

Other collaboration functionality may be enabled as well. For example, a user may select a portion of the document for discussion, which may then cause a message to be posted to the chat channel identifying the selected portion and an indication that the user wishes to discuss it in the chat channel. Similarly, such discussions may be established as threads within the chat channel that may be established for limited times to discuss specific portions of the document, whether a selected portion of the document, a comment, or some other aspect of the document.

By integrating chat and document editing functionality, users can more readily collaborate during the document creation process. It can foster improved communication within a team of users and lead to higher quality output from the team.

This illustrative example is given to introduce the reader to the general subject matter discussed herein and the disclosure is not limited to this example. The following sections describe various additional non-limiting examples and examples of integrating chat channels with document editing.

Referring now to FIG. 1, FIG. 1 shows an example system 100 that provides videoconferencing functionality to various client devices. The system 100 includes a virtual conference provider 110 that is connected to multiple communication networks 120, 130, through which various client devices 140-180 can participate in virtual conferences hosted by the virtual conference provider 110. For example, the virtual conference provider 110 can be located within a private network to provide video conferencing services to devices within the private network, or it can be connected to a public network, e.g., the internet, so it may be accessed by anyone. Some examples may even provide a hybrid model in which a virtual conference provider 110 may supply components to enable a private organization to host private internal virtual conferences or to connect its system to the virtual conference provider 110 over a public network.

The system optionally also includes one or more user identity providers, e.g., user identity provider 115, which can provide user identity services to users of the client devices 140-160 and may authenticate user identities of one or more users to the virtual conference provider 110. In this example, the user identity provider 115 is operated by a different entity than the virtual conference provider 110, though in some examples, they may be the same entity.

Figure 2:
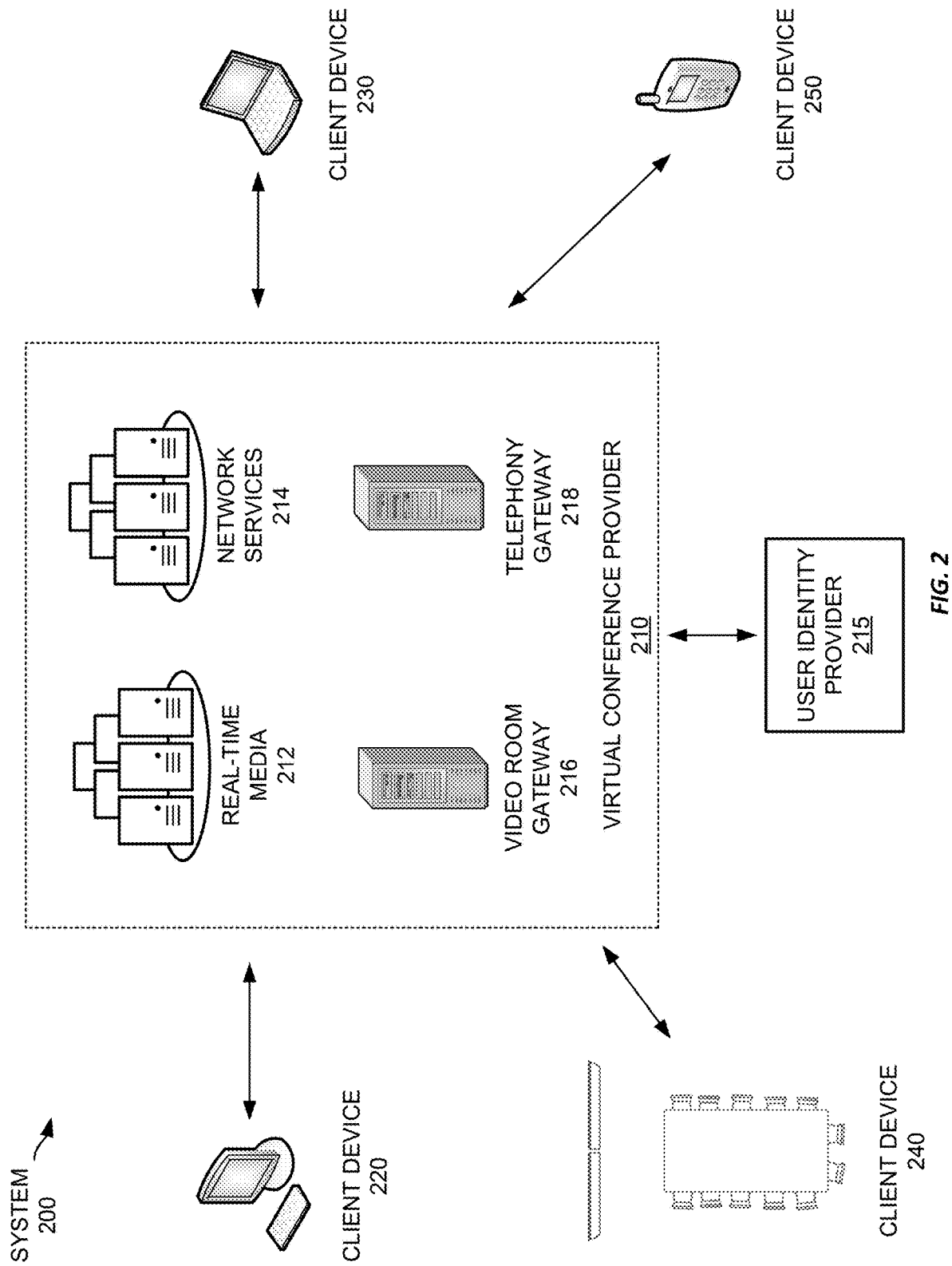

Virtual conference provider 110 allows clients to create videoconference meetings (or "meetings") and invite others to participate in those meetings as well as perform other related functionality, such as recording the meetings, generating transcripts from meeting audio, manage user functionality in the meetings, enable text messaging during the meetings, create and manage breakout rooms from the main meeting, etc. FIG. 2, described below, provides a more detailed description of the architecture and functionality of the virtual conference provider 110.

Meetings in this example virtual conference provider 110 are provided in virtual "rooms" to which participants are connected. The room in this context is a construct provided by a server that provides a common point at which the various video and audio data is received before being multiplexed and provided to the various participants. While a "room" is the label for this concept in this disclosure, any suitable functionality that enables multiple participants to participate in a common videoconference may be used. Further, in some examples, and as alluded to above, a meeting may also have "breakout" rooms. Such breakout rooms may also be rooms that are associated with a "main" videoconference room. Thus, participants in the main videoconference room may exit the room into a breakout room, e.g., to discuss a particular topic, before returning to the main room. The breakout rooms in this example are discrete meetings that are associated with the meeting in the main room. However, to join a breakout room, a participant must first enter the main room. A room may have any number of associated breakout rooms according to various examples.

To create a meeting with the virtual conference provider 110, a user may contact the virtual conference provider 110 using a client device 140-180 and select an option to create a new meeting. Such an option may be provided in a webpage accessed by a client device 140-160 or client application executed by a client device 140-160. For telephony devices, the user may be presented with an audio menu that they may navigate by pressing numeric buttons on their telephony device. To create the meeting, the virtual conference provider 110 may prompt the user for certain information, such as a date, time, and duration for the meeting, a number of participants, a type of encryption to use, whether the meeting is confidential or open to the public, etc. After receiving the various meeting settings, the virtual conference provider may create a record for the meeting and generate a meeting identifier and, in some examples, a corresponding meeting password or passcode (or other authentication information), all of which meeting information is provided to the meeting host.

After receiving the meeting information, the user may distribute the meeting information to one or more users to invite them to the meeting. To begin the meeting at the scheduled time (or immediately, if the meeting was set for an immediate start), the host provides the meeting identifier and, if applicable, corresponding authentication information (e.g., a password or passcode). The virtual conference system then initiates the meeting and may admit users to the meeting. Depending on the options set for the meeting, the users may be admitted immediately upon providing the appropriate meeting identifier (and authentication information, as appropriate), even if the host has not yet arrived, or the users may be presented with information indicating that the meeting has not yet started or the host may be required to specifically admit one or more of the users.

During the meeting, the participants may employ their client devices 140-180 to capture audio or video information and stream that information to the virtual conference provider 110. They also receive audio or video information from the virtual conference provider 110, which is displayed by the respective client device 140 to enable the various users to participate in the meeting.

At the end of the meeting, the host may select an option to terminate the meeting, or it may terminate automatically at a scheduled end time or after a predetermined duration. When the meeting terminates, the various participants are disconnected from the meeting and they will no longer receive audio or video streams for the meeting (and will stop transmitting audio or video streams). The virtual conference provider 110 may also invalidate the meeting information, such as the meeting identifier or password/passcode.

To provide such functionality, one or more client devices 140-180 may communicate with the virtual conference provider 110 using one or more communication networks, such as network 120 or the public switched telephone network ("PSTN") 130. The client devices 140-180 may be any suitable computing or communications device that have audio or video capability. For example, client devices 140-160 may be conventional computing devices, such as desktop or laptop computers having processors and computer-readable media, connected to the virtual conference provider 110 using the internet or other suitable computer network. Suitable networks include the internet, any local area network ("LAN"), metro area network ("MAN"), wide area network ("WAN"), cellular network (e.g., 3G, 4G, 4G LTE, 5G, etc.), or any combination of these. Other types of computing devices may be used instead or as well, such as tablets, smartphones, and dedicated video conferencing equipment. Each of these devices may provide both audio and video capabilities and may enable one or more users to participate in a virtual conference meeting hosted by the virtual conference provider 110.

In addition to the computing devices discussed above, client devices 140-180 may also include one or more telephony devices, such as cellular telephones (e.g., cellular telephone 170), internet protocol ("IP") phones (e.g., telephone 180), or conventional telephones. Such telephony devices may allow a user to make conventional telephone calls to other telephony devices using the PSTN, including the virtual conference provider 110. It should be appreciated that certain computing devices may also provide telephony functionality and may operate as telephony devices. For example, smartphones typically provide cellular telephone capabilities and thus may operate as telephony devices in the example system 100 shown in FIG. 1. In addition, conventional computing devices may execute software to enable telephony functionality, which may allow the user to make and receive phone calls, e.g., using a headset and microphone. Such software may communicate with a PSTN gateway to route the call from a computer network to the PSTN. Thus, telephony devices encompass any devices that can make conventional telephone calls and is not limited solely to dedicated telephony devices like conventional telephones.

Referring again to client devices 140-160, these devices 140-160 contact the virtual conference provider 110 using network 120 and may provide information to the virtual conference provider 110 to access functionality provided by the virtual conference provider 110, such as access to create new meetings or join existing meetings. To do so, the client devices 140-160 may provide user identification information, meeting identifiers, meeting passwords or passcodes, etc. In examples that employ a user identity provider 115, a client device, e.g., client devices 140-160, may operate in conjunction with a user identity provider 115 to provide user identification information or other user information to the virtual conference provider 110.

A user identity provider 115 may be any entity trusted by the virtual conference provider 110 that can help identify a user to the virtual conference provider 110. For example, a trusted entity may be a server operated by a business or other organization and with whom the user has established their identity, such as an employer or trusted third-party. The user may sign into the user identity provider 115, such as by providing a username and password, to access their identity at the user identity provider 115. The identity, in this sense, is information established and maintained at the user identity provider 115 that can be used to identify a particular user, irrespective of the client device they may be using. An example of an identity may be an email account established at the user identity provider 110 by the user and secured by a password or additional security features, such as biometric authentication, two-factor authentication, etc. However, identities may be distinct from functionality such as email. For example, a health care provider may establish identities for its patients. And while such identities may have associated email accounts, the identity is distinct from those email accounts. Thus, a user's "identity" relates to a secure, verified set of information that is tied to a particular user and should be accessible only by that user. By accessing the identity, the associated user may then verify themselves to other computing devices or services, such as the virtual conference provider 110.

When the user accesses the virtual conference provider 110 using a client device, the virtual conference provider 110 communicates with the user identity provider 115 using information provided by the user to verify the user's identity. For example, the user may provide a username or cryptographic signature associated with a user identity provider 115. The user identity provider 115 then either confirms the user's identity or denies the request. Based on this response, the virtual conference provider 110 either provides or denies access to its services, respectively.

For telephony devices, e.g., client devices 170-180, the user may place a telephone call to the virtual conference provider 110 to access virtual conference services. After the call is answered, the user may provide information regarding a virtual conference meeting, e.g., a meeting identifier ("ID"), a passcode or password, etc., to allow the telephony device to join the meeting and participate using audio devices of the telephony device, e.g., microphone(s) and speaker(s), even if video capabilities are not provided by the telephony device.

Because telephony devices typically have more limited functionality than conventional computing devices, they may be unable to provide certain information to the virtual conference provider 110. For example, telephony devices may be unable to provide user identification information to identify the telephony device or the user to the virtual conference provider 110. Thus, the virtual conference provider 110 may provide more limited functionality to such telephony devices. For example, the user may be permitted to join a meeting after providing meeting information, e.g., a meeting identifier and passcode, but they may be identified only as an anonymous participant in the meeting. This may restrict their ability to interact with the meetings in some examples, such as by limiting their ability to speak in the meeting, hear or view certain content shared during the meeting, or access other meeting functionality, such as joining breakout rooms or engaging in text chat with other participants in the meeting.

It should be appreciated that users may choose to participate in meetings anonymously and decline to provide user identification information to the virtual conference provider 110, even in cases where the user has an authenticated identity and employs a client device capable of identifying the user to the virtual conference provider 110. The virtual conference provider 110 may determine whether to allow such anonymous users to use services provided by the virtual conference provider 110. Anonymous users, regardless of the reason for anonymity, may be restricted as discussed above with respect to users employing telephony devices, and in some cases may be prevented from accessing certain meetings or other services, or may be entirely prevented from accessing the virtual conference provider 110.

Referring again to virtual conference provider 110, in some examples, it may allow client devices 140-160 to encrypt their respective video and audio streams to help improve privacy in their meetings. Encryption may be provided between the client devices 140-160 and the virtual conference provider 110 or it may be provided in an end-to-end configuration where multimedia streams transmitted by the client devices 140-160 are not decrypted until they are received by another client device 140-160 participating in the meeting. Encryption may also be provided during only a portion of a communication, for example encryption may be used for otherwise unencrypted communications that cross international borders.

Client-to-server encryption may be used to secure the communications between the client devices 140-160 and the virtual conference provider 110, while allowing the virtual conference provider 110 to access the decrypted multimedia streams to perform certain processing, such as recording the meeting for the participants or generating transcripts of the meeting for the participants. End-to-end encryption may be used to keep the meeting entirely private to the participants without any worry about a virtual conference provider 110 having access to the substance of the meeting. Any suitable encryption methodology may be employed, including key-pair encryption of the streams. For example, to provide end-to-end encryption, the meeting host's client device may obtain public keys for each of the other client devices participating in the meeting and securely exchange a set of keys to encrypt and decrypt multimedia content transmitted during the meeting. Thus the client devices 140-160 may securely communicate with each other during the meeting.

Further, in some examples, certain types of encryption may be limited by the types of devices participating in the meeting. For example, telephony devices may lack the ability to encrypt and decrypt multimedia streams. Thus, while encrypting the multimedia streams may be desirable in many instances, it is not required as it may prevent some users from participating in a meeting.

By using the example system shown in FIG. 1, users can create and participate in meetings using their respective client devices 140-180 via the virtual conference provider 110. Further, such a system enables users to use a wide variety of different client devices 140-180 from traditional standards-based video conferencing hardware to dedicated video conferencing equipment to laptop or desktop computers to handheld devices to legacy telephony devices, etc.

Referring now to FIG. 2, FIG. 2 shows an example system 200 in which a virtual conference provider 210 provides videoconferencing functionality to various client devices 220-250. The client devices 220-250 include two conventional computing devices 220-230, dedicated equipment for a video conference room 240, and a telephony device 250. Each client device 220-250 communicates with the virtual conference provider 210 over a communications network, such as the internet for client devices 220-240 or the PSTN for client device 250, generally as described above with respect to FIG. 1. The virtual conference provider 210 is also in communication with one or more user identity providers 215, which can authenticate various users to the virtual conference provider 210 generally as described above with respect to FIG. 1.

In this example, the virtual conference provider 210 employs multiple different servers (or groups of servers) to provide different aspects of virtual conference functionality, thereby enabling the various client devices to create and participate in virtual conference meetings. The virtual conference provider 210 uses one or more real-time media servers 212, one or more network services servers 214, one or more video room gateways 216, and one or more telephony gateways 218. Each of these servers 212-218 is connected to one or more communications networks to enable them to collectively provide access to and participation in one or more virtual conference meetings to the client devices 220-250.

The real-time media servers 212 provide multiplexed multimedia streams to meeting participants, such as the client devices 220-250 shown in FIG. 2. While video and audio streams typically originate at the respective client devices, they are transmitted from the client devices 220-250 to the virtual conference provider 210 via one or more networks where they are received by the real-time media servers 212. The real-time media servers 212 determine which protocol is optimal based on, for example, proxy settings and the presence of firewalls, etc. For example, the client device might select among UDP, TCP, TLS, or HTTPS for audio and video and UDP for content screen sharing.

The real-time media servers 212 then multiplex the various video and audio streams based on the target client device and communicate multiplexed streams to each client device. For example, the real-time media servers 212 receive audio and video streams from client devices 220-240 and only an audio stream from client device 250. The real-time media servers 212 then multiplex the streams received from devices 230-250 and provide the multiplexed streams to client device 220. The real-time media servers 212 are adaptive, for example, reacting to real-time network and client changes, in how they provide these streams. For example, the real-time media servers 212 may monitor parameters such as a client's bandwidth CPU usage, memory and network I/O as well as network parameters such as packet loss, latency and jitter to determine how to modify the way in which streams are provided.

The client device 220 receives the stream, performs any decryption, decoding, and demultiplexing on the received streams, and then outputs the audio and video using the client device's video and audio devices. In this example, the real-time media servers do not multiplex client device 220's own video and audio feeds when transmitting streams to it. Instead each client device 220-250 only receives multimedia streams from other client devices 220-250. For telephony devices that lack video capabilities, e.g., client device 250, the real-time media servers 212 only deliver multiplex audio streams. The client device 220 may receive multiple streams for a particular communication, allowing the client device 220 to switch between streams to provide a higher quality of service.

In addition to multiplexing multimedia streams, the real-time media servers 212 may also decrypt incoming multimedia stream in some examples. As discussed above, multimedia streams may be encrypted between the client devices 220-250 and the virtual conference system 210. In some such examples, the real-time media servers 212 may decrypt incoming multimedia streams, multiplex the multimedia streams appropriately for the various clients, and encrypt the multiplexed streams for transmission.

In some examples, to provide multiplexed streams, the virtual conference provider 210 may receive multimedia streams from the various participants and publish those streams to the various participants to subscribe to and receive. Thus, the virtual conference provider 210 notifies a client device, e.g., client device 220, about various multimedia streams available from the other client devices 230-250, and the client device 220 can select which multimedia stream(s) to subscribe to and receive. In some examples, the virtual conference provider 210 may provide to each client device the available streams from the other client devices, but from the respective client device itself, though in other examples it may provide all available streams to all available client devices. Using such a multiplexing technique, the virtual conference provider 210 may enable multiple different streams of varying quality, thereby allowing client devices to change streams in real-time as needed, e.g., based on network bandwidth, latency, etc.

As mentioned above with respect to FIG. 1, the virtual conference provider 210 may provide certain functionality with respect to unencrypted multimedia streams at a user's request. For example, the meeting host may be able to request that the meeting be recorded or that a transcript of the audio streams be prepared, which may then be performed by the real-time media servers 212 using the decrypted multimedia streams, or the recording or transcription functionality may be off-loaded to a dedicated server (or servers), e.g., cloud recording servers, for recording the audio and video streams. In some examples, the virtual conference provider 210 may allow a meeting participant to notify it of inappropriate behavior or content in a meeting. Such a notification may trigger the real-time media servers to 212 record a portion of the meeting for review by the virtual conference provider 210. Still other functionality may be implemented to take actions based on the decrypted multimedia streams at the virtual conference provider 210, such as monitoring video or audio quality, adjusting or changing media encoding mechanisms, etc.

It should be appreciated that multiple real-time media servers 212 may be involved in communicating data for a single meeting and multimedia streams may be routed through multiple different real-time media servers 212. In addition, the various real-time media servers 212 may not be co-located, but instead may be located at multiple different geographic locations, which may enable high-quality communications between clients that are dispersed over wide geographic areas, such as being located in different countries or on different continents. Further, in some examples, one or more of these servers may be co-located on a client's premises, e.g., at a business or other organization. For example, different geographic regions may each have one or more real-time media servers 212 to enable client devices in the same geographic region to have a high-quality connection into the virtual conference provider 210 via local servers 212 to send and receive multimedia streams, rather than connecting to a real-time media server located in a different country or on a different continent. The local real-time media servers 212 may then communicate with physically distant servers using high-speed network infrastructure, e.g., internet backbone network(s), that otherwise might not be directly available to client devices 220-250 themselves. Thus, routing multimedia streams may be distributed throughout the virtual conference system 210 and across many different real-time media servers 212.

Turning to the network services servers 214, these servers 214 provide administrative functionality to enable client devices to create or participate in meetings, send meeting invitations, create or manage user accounts or subscriptions, and other related functionality. Further, these servers may be configured to perform different functionalities or to operate at different levels of a hierarchy, e.g., for specific regions or localities, to manage portions of the virtual conference provider 210 under a supervisory set of servers. When a client device 220-250 accesses the virtual conference provider 210, it will typically communicate with one or more network services servers 214 to access their account or to participate in a meeting.

When a client device 220-250 first contacts the virtual conference provider 210 in this example, it is routed to a network services server 214. The client device may then provide access credentials for a user, e.g., a username and password or single sign-on credentials, to gain authenticated access to the virtual conference provider 210. This process may involve the network services servers 214 contacting a user identity provider 215 to verify the provided credentials. Once the user's credentials have been accepted, the client device 214 may perform administrative functionality, like updating user account information, if the user has an identity with the virtual conference provider 210, or scheduling a new meeting, by interacting with the network services servers 214.

In some examples, users may access the virtual conference provider 210 anonymously. When communicating anonymously, a client device 220-250 may communicate with one or more network services servers 214 but only provide information to create or join a meeting, depending on what features the virtual conference provider 210 allows for anonymous users. For example, an anonymous user may access the virtual conference provider using client 220 and provide a meeting ID and passcode. The network services server 214 may use the meeting ID to identify an upcoming or on-going meeting and verify the passcode is correct for the meeting ID. After doing so, the network services server(s) 214 may then communicate information to the client device 220 to enable the client device 220 to join the meeting and communicate with appropriate real-time media servers 212.

In cases where a user wishes to schedule a meeting, the user (anonymous or authenticated) may select an option to schedule a new meeting and may then select various meeting options, such as the date and time for the meeting, the duration for the meeting, a type of encryption to be used, one or more users to invite, privacy controls (e.g., not allowing anonymous users, preventing screen sharing, manually authorize admission to the meeting, etc.), meeting recording options, etc. The network services servers 214 may then create and store a meeting record for the scheduled meeting. When the scheduled meeting time arrives (or within a threshold period of time in advance), the network services server(s) 214 may accept requests to join the meeting from various users.

To handle requests to join a meeting, the network services server(s) 214 may receive meeting information, such as a meeting ID and passcode, from one or more client devices 220-250. The network services server(s) 214 locate a meeting record corresponding to the provided meeting ID and then confirm whether the scheduled start time for the meeting has arrived, whether the meeting host has started the meeting, and whether the passcode matches the passcode in the meeting record. If the request is made by the host, the network services server(s) 214 activates the meeting and connects the host to a real-time media server 212 to enable the host to begin sending and receiving multimedia streams.

Once the host has started the meeting, subsequent users requesting access will be admitted to the meeting if the meeting record is located and the passcode matches the passcode supplied by the requesting client device 220-250. In some examples additional access controls may be used as well. But if the network services server(s) 214 determines to admit the requesting client device 220-250 to the meeting, the network services server 214 identifies a real-time media server 212 to handle multimedia streams to and from the requesting client device 220-250 and provides information to the client device 220-250 to connect to the identified real-time media server 212. Additional client devices 220-250 may be added to the meeting as they request access through the network services server(s) 214.

After joining a meeting, client devices will send and receive multimedia streams via the real-time media servers 212, but they may also communicate with the network services servers 214 as needed during meetings. For example, if the meeting host leaves the meeting, the network services server(s) 214 may appoint another user as the new meeting host and assign host administrative privileges to that user. Hosts may have administrative privileges to allow them to manage their meetings, such as by enabling or disabling screen sharing, muting or removing users from the meeting, creating sub-meetings or "break-out" rooms, recording meetings, etc. Such functionality may be managed by the network services server(s) 214.

For example, if a host wishes to remove a user from a meeting, they may identify the user and issue a command through a user interface on their client device. The command may be sent to a network services server 214, which may then disconnect the identified user from the corresponding real-time media server 212. If the host wishes to create a break-out room for one or more meeting participants to join, such a command may also be handled by a network services server 214, which may create a new meeting record corresponding to the break-out room and then connect one or more meeting participants to the break-out room similarly to how it originally admitted the participants to the meeting itself.

In addition to creating and administering on-going meetings, the network services server(s) 214 may also be responsible for closing and tearing-down meetings once they have completed. For example, the meeting host may issue a command to end an on-going meeting, which is sent to a network services server 214. The network services server 214 may then remove any remaining participants from the meeting, communicate with one or more real time media servers 212 to stop streaming audio and video for the meeting, and deactivate, e.g., by deleting a corresponding passcode for the meeting from the meeting record, or delete the meeting record(s) corresponding to the meeting. Thus, if a user later attempts to access the meeting, the network services server(s) 214 may deny the request.

Depending on the functionality provided by the virtual conference provider, the network services server(s) 214 may provide additional functionality, such as by providing private meeting capabilities for organizations, special types of meetings (e.g., webinars), etc. Such functionality may be provided according to various examples of video conferencing providers according to this description.

Referring now to the video room gateway servers 216, these servers 216 provide an interface between dedicated video conferencing hardware, such as may be used in dedicated video conferencing rooms. Such video conferencing hardware may include one or more cameras and microphones and a computing device designed to receive video and audio streams from each of the cameras and microphones and connect with the virtual conference provider 210. For example, the video conferencing hardware may be provided by the virtual conference provider 210 to one or more of its subscribers, which may provide access credentials to the video conferencing hardware to use to connect to the virtual conference provider 210.

The video room gateway servers 216 provide specialized authentication and communication with the dedicated video conferencing hardware that may not be available to other client devices 220-230, 250. For example, the video conferencing hardware may register with the virtual conference provider 210 when it is first installed and the video room gateway servers 216 may authenticate the video conferencing hardware using such registration as well as information provided to the video room gateway server(s) 216 when dedicated video conferencing hardware connects to it, such as device ID information, subscriber information, hardware capabilities, hardware version information etc. Upon receiving such information and authenticating the dedicated video conferencing hardware, the video room gateway server(s) 216 may interact with the network services servers 214 and real-time media servers 212 to allow the video conferencing hardware to create or join meetings hosted by the virtual conference provider 210.

Referring now to the telephony gateway servers 218, these servers 218 enable and facilitate telephony devices' participation in meetings hosed by the virtual conference provider 210. Because telephony devices communicate using the PSTN and not using computer networking protocols, such as TCP/IP, the telephony gateway servers 218 act as an interface that converts between the PSTN and the networking system used by the virtual conference provider 210.

For example, if a user uses a telephony device to connect to a meeting, they may dial a phone number corresponding to one of the virtual conference provider's telephony gateway servers 218. The telephony gateway server 218 will answer the call and generate audio messages requesting information from the user, such as a meeting ID and passcode. The user may enter such information using buttons on the telephony device, e.g., by sending dual-tone multi-frequency ("DTMF") audio signals to the telephony gateway server 218. The telephony gateway server 218 determines the numbers or letters entered by the user and provides the meeting ID and passcode information to the network services servers 214, along with a request to join or start the meeting, generally as described above. Once the telephony client device 250 has been accepted into a meeting, the telephony gateway server 218 is instead joined to the meeting on the telephony device's behalf.

After joining the meeting, the telephony gateway server 218 receives an audio stream from the telephony device and provides it to the corresponding real-time media server 212, and receives audio streams from the real-time media server 212, decodes them, and provides the decoded audio to the telephony device. Thus, the telephony gateway servers 218 operate essentially as client devices, while the telephony device operates largely as an input/output device, e.g., a microphone and speaker, for the corresponding telephony gateway server 218, thereby enabling the user of the telephony device to participate in the meeting despite not using a computing device or video.

It should be appreciated that the components of the virtual conference provider 210 discussed above are merely examples of such devices and an example architecture. Some virtual conference providers may provide more or less functionality than described above and may not separate functionality into different types of servers as discussed above. Instead, any suitable servers and network architectures may be used according to different examples.

Figure 3A:
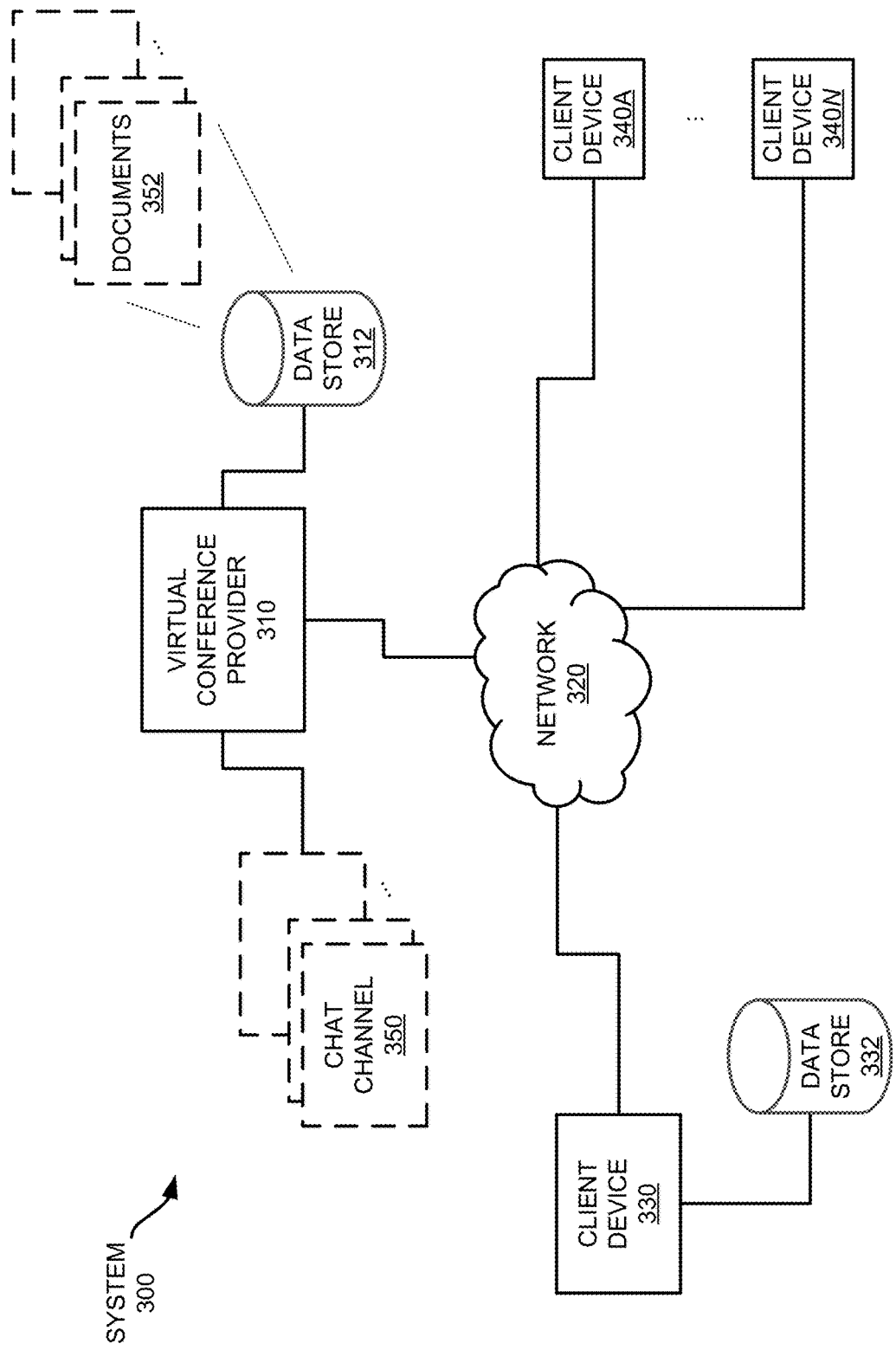
FIGS. 3A-3C show an example system for integrating chat channels with document editing.

Referring now to FIG. 3A, FIG. 3A shows an example system 300 for integrating chat channels with document editing. The system 300 shown in FIG. 3A includes a virtual conference provider 310 that has established and maintains multiple chat channels 350. The system 300 also includes multiple client devices 330, 340a-n that are connected to the virtual conference provider 310 via a network 320. In this example, the network 320 is the internet; however, any communications network or combination of communications networks may be employed. And while the system 300 is depicted as including multiple client devices 330, 340a-n, it should be appreciated that some example systems may not include any client devices at any particular time.

The virtual conference provider 310 establishes chat channels 350 at the request of corresponding users and stores one or more records in a data store 312 to represent the configuration and state of each chat channel 350. Each of the chat channels 350 established and maintained by the virtual conference provider 310 allows users to connect to the respective chat channel and review and post messages or other content to the chat channel. However, each of the chat channels 350 persists independently of whether any users are connected to the chat channel. Thus, the chat channel remains latent and available for use at any time.

To access a chat channel, a user, such as the user of client device 330, accesses the virtual conference provider 310, such as by providing access credentials. Once the user has logged in, they may be presented with a graphical user interface ("GUI") by a client application that allows the user to navigate to chat functionality and view the available chat channels that the user is a member of. The user may then select and interact with the chat channel of their choice. Example GUIs are discussed in more detail below with respect to FIGS. 4A-4H.

In addition to maintaining and managing the various chat channels 350, the virtual conference provider 310 maintains and provides access to various documents 352 stored in a data store 312. Access to the documents is via the client application as well, where the user may select a document of interest for reviewing or editing. The documents 352 maintained by the virtual conference provider 310 are accessible via online editing functionality, such as provided by a client application provided by the virtual conferencing application. Because the documents 352 are accessible online via a network connection, but maintained remotely from any client device 330, 340a-n, they may be easily shared between different users. Thus, while the documents 352 discussed in the examples herein are referred to as documents, it should be appreciated that they are shared documents accessible by any users with sufficient access rights.

Figure 3B:
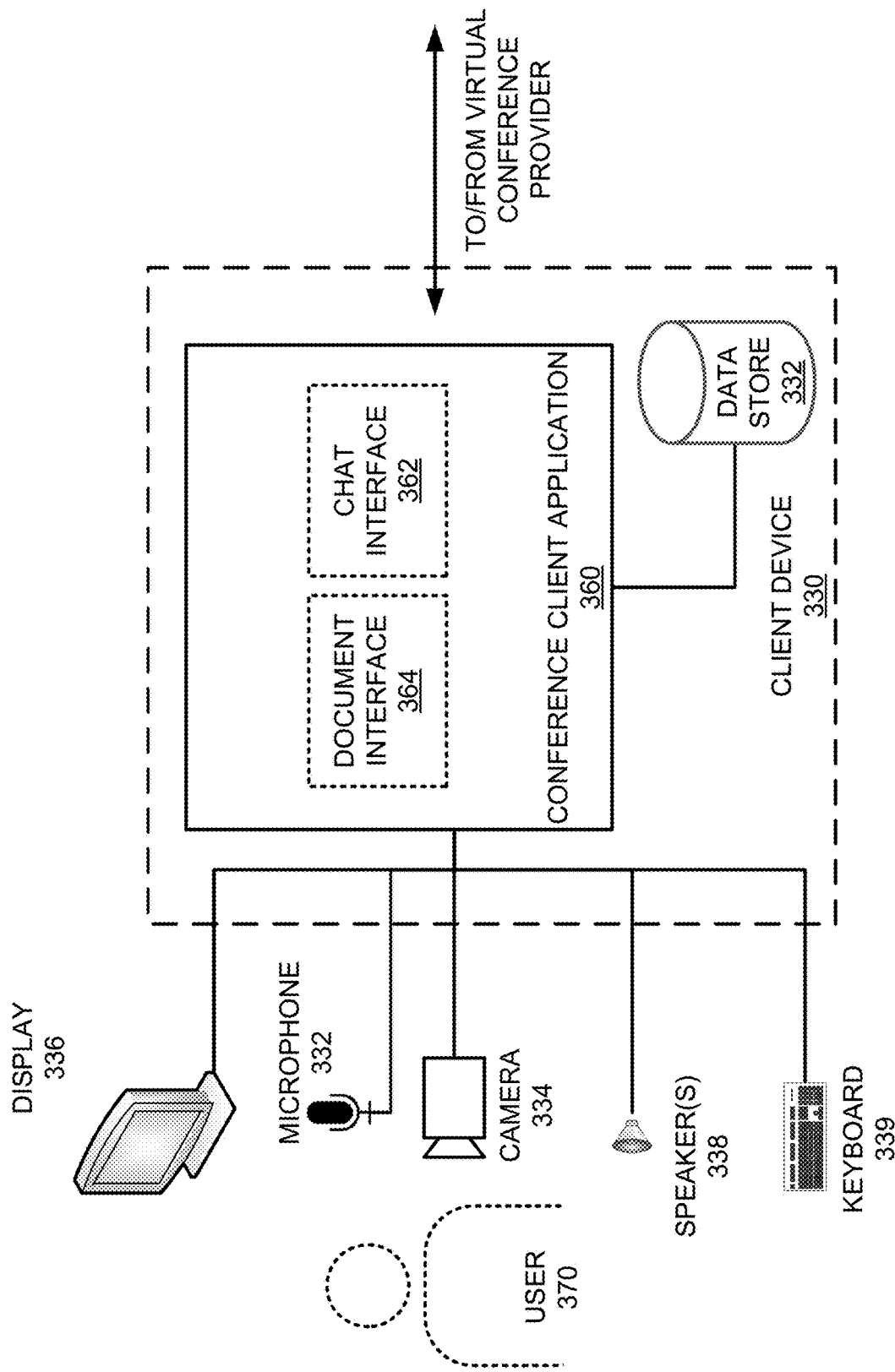

Referring now to FIG. 3B, FIG. 3B shows a client device 330 that executes a virtual conference client application 360 (or "client application"). The client application 360 provides functionality to enable the user 370 to interact with chat channels 350 and documents 352, such as to post and review content within the various chat channels 350 or to view or edit one or more documents 352. The client application also provides other functionality, such as to join and participate in virtual conferences, as discussed above with respect to FIGS. 1-2, conference scheduling, person-to-person voice chats (similar to a conventional telephone call), view contact information of other users, or any other suitable functionality.

To enable user engagement with the various functionality available via the client application 360, the client application 360 interacts with various input and output devices, such as a microphone 332 and camera 334, display 336 and speaker(s) 338, and keyboard 339. The client application 360 can control the microphone 332 and camera 334 to capture audio and video streams to send to the virtual conference provider, the display 336 to present a graphical user interface ("GUI") for the user 370 to interact with, which may include video output from received video streams, and the speaker(s) 338 to output received audio streams. The user may also use the keyboard 339 to enter chat messages or create or edit documents 352.

Interactions with chat channels 350 and documents 352 are provided via the chat interface 362 and document interface 364 provided by the client application 360. These interfaces 362-364 provide GUIs to enable various inputs and outputs from and to the user. In addition, the interfaces 362-364 interact with the virtual conference provider 310 to access chat channels 350 and documents 352. Because the chat channels 350 and documents 352 are maintained at the virtual conference provider 310 and it mediates access to them, the interfaces 362-364 can provide credential information, text or other content entry and display, and identify and display which chat channels and documents are available to the user.

Figure 3C:
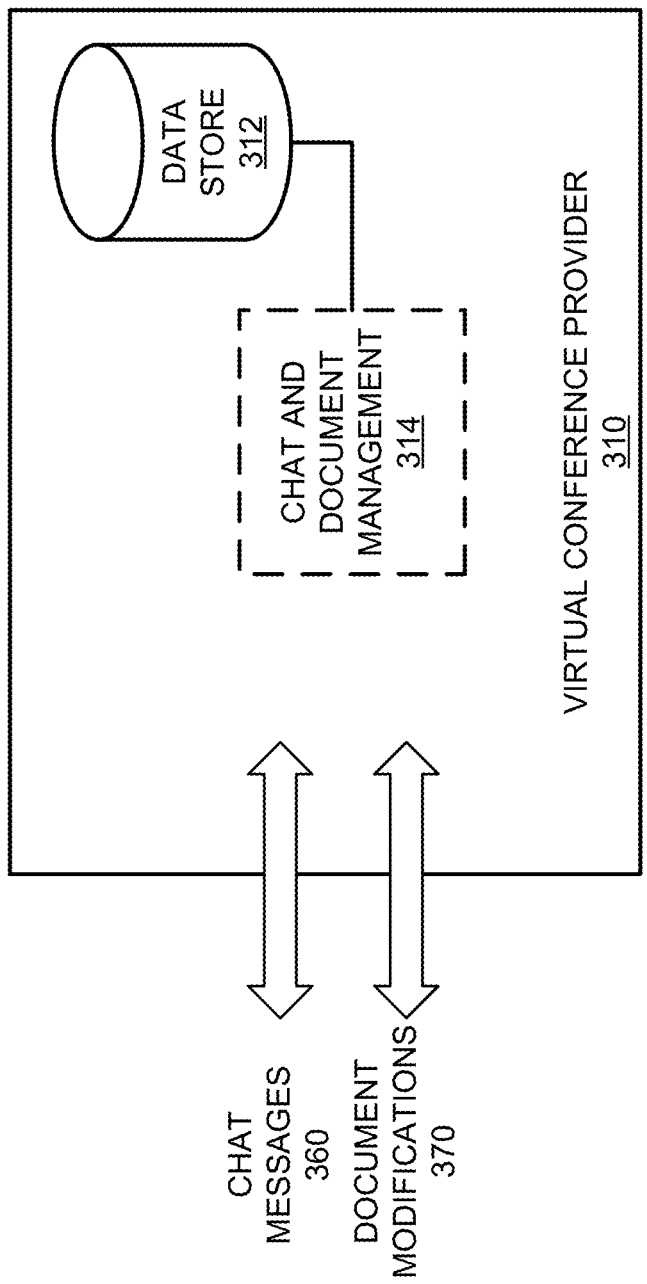

Referring now to FIG. 3C, FIG. 3C shows the virtual conference provider 310, which provides chat and document management 314 for users who connect to chat channels 350 or documents 352 using their client devices 330, 340a-n. The virtual conference provider 310 authenticates users based on usernames and passwords and, once a user has provided their credentials, the virtual conference provider 310 enables access to chat channels and documents that the user is authorized to access. Access in this example is mediated by the chat and document management system 314. When a user uses a client application 360 to access chat channels or documents, the virtual conference provider 310 can provide identities of the various chat channels or documents the user has access to, which the client application 360 then displays within a GUI. The user can then select the chat channel or document of interest, or switch between chat channels and document editing, and the chat and document management system 314 provides the requested resources.

Once a user has accessed a chat channel or document, the virtual conference provider 310 provides the content from the requested resource—whether a chat channel, chat messages, a list of documents, or a specific document—to the client application, which displays it within the GUI. The user may then interact with the chat channel by posting chat messages 360, including text messages or other content, and receiving chat messages 360 posted by other users. Similarly, as the user modifies a selected document, or another user contemporaneously modifies the selected document, the user's client application provides document modifications 370 to the chat and document management system 314 and receives modifications 370 made by other users. The chat and document management system 314 then updates the respective chat channel or document in the data store 312 based on the various chat messages 360 or document modifications 370 it receives.

In this example, however, the chat and document management system 314 has been configured to automatically generate a new document when a new chat channel is created, or a new chat channel when a new document is created. Users interacting with their client applications 360 may select options to create these new resources, which commands are sent to the virtual conference provider 310. The commands are routed to the chat and document management system 314, which creates the requested resources, but also creates a companion resource: a new document for a new chat channel, or a new chat channel for a new document. The new resources are then stored in the data store 312 and made accessible to the user.

After creating the new resource and the new companion resource, the chat and document management system 314 associates the two within the data store 312, including providing common access rights to users that later may be authorized to access one or the other. In addition, the chat and document management system 314 executes instructions when a user is posting chat messages to the new chat channel or modifications to the new document to selectively share content between the two resources. For example, if a user accesses the new document and adds new content to it, the chat and document management system 314 monitors the received document modifications 370 and may selectively post a message to the chat channel. For example, if a user spends twenty minutes revising the document, once the user has closed the document or has been idle for a threshold period of time, the chat and document management system 314 may post a message to the chat channel identifying the user who has modified the document and indicating that the document has been modified. Further, it may provide an interactive link in the message to allow members of the chat channel to jump to the document and, in some examples, to a specific portion of the document that the user has modified.

Similarly, in some examples, a user may post a comment in the document, such as by selecting a portion of content and selecting an option to provide a comment. After posting the comment, the chat and document management system 314 may then publish the comment to the chat channel and identify the user who posted the comment. The chat and document management system 314 may also include an interactive link to allow members of the chat channel to jump directly to the comment within the document.

Similarly, a member of the chat channel may reply to the comment posted by the chat and document management system 314. The chat and document management system 314 may determine that the user has replied to the comment and post the reply as a comment within the document corresponding to the original comment. For example, the user may select the comment in the chat channel and choose an option to "Reply" to the posted message. The reply message may then be posted to the document. Similarly, a member of the chat channel may reply to the message posted by the chat and document management system 314 indicating that modifications were made to the document to supply a comment or additional content for the document. The reply message posted to the chat channel may then be either inserted into the document as additional content or as a comment, depending on a user selection.

Alternatively, a user may select an option to post content to the chat channel that should also be inserted into the document. For example, the GUI may provide the option to post a chat message or to post a document message. If the user selects the option to post a document message, the comment may then be posted to the chat channel and also inserted into the document, either as new content or as a new comment. Using such functionality, users may more effectively collaborate when preparing a new document as a part of a team.

Referring now to FIGS. 4A-4H, FIGS. 4A-4H show different views of a GUI 400 presented by a client application 360. The GUI 400 includes a number of options 410 for different functionality provided by the virtual conference provider 310, including virtual meetings, a user home page, VOIP phone functionality, chat 412, document editing 414, and the user's contacts. In the view of the GUI 400 shown in FIG. 4A, the user has selected the chat option 412 and is presented with a view of the chat functionality. In a sidebar 402, a list of chat channels 420 that the user is a member of is shown, though since none are selected, no chat entry functionality is displayed yet. In addition, the GUI 400 provides the option to create a new chat channel, which will be discussed in more detail below with respect to FIG. 4C.

Figure 4A:
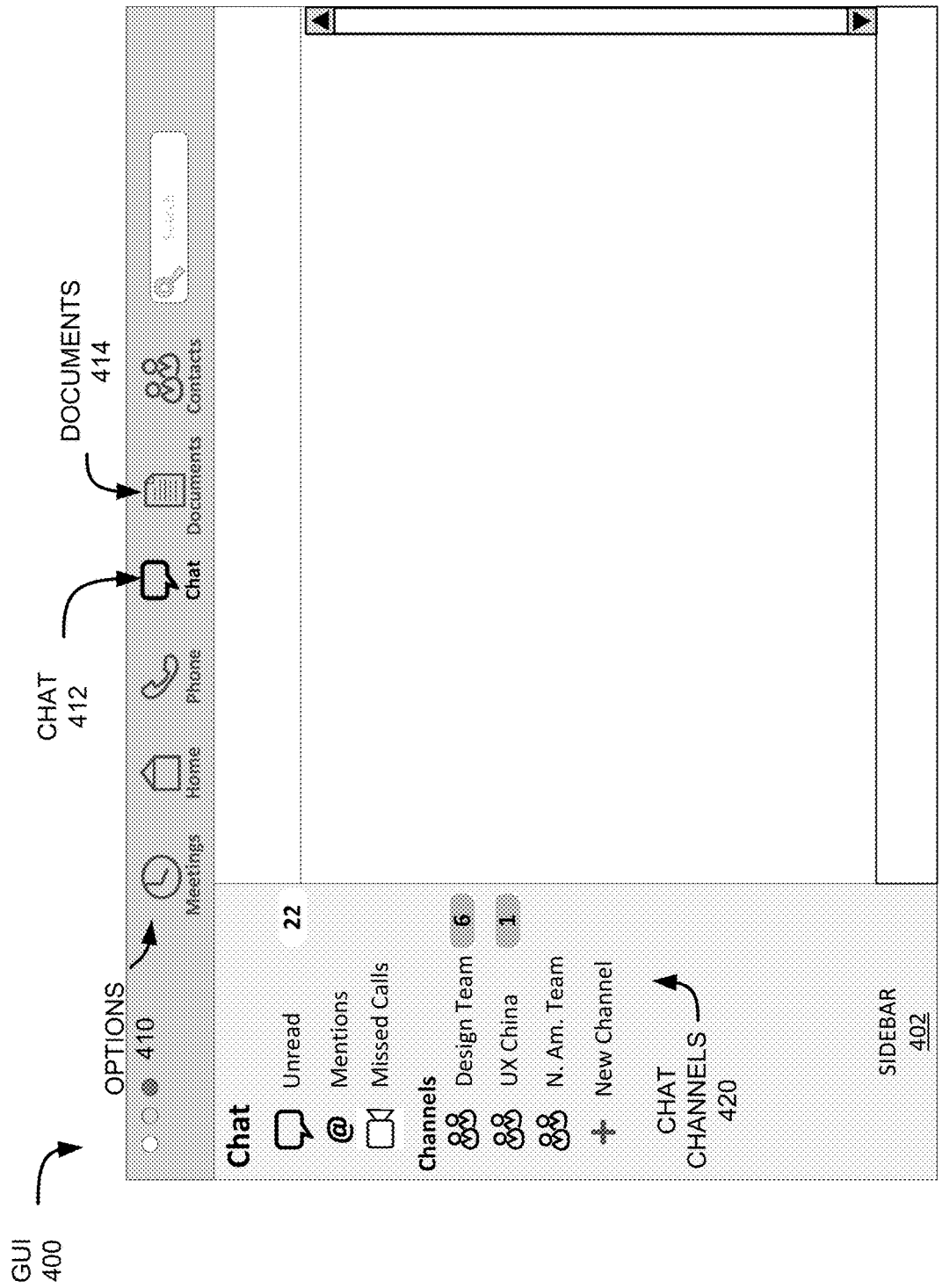
FIGS. 4A-4H show views of an example graphical user interface for integrating chat channels with document editing.
Figure 4B:
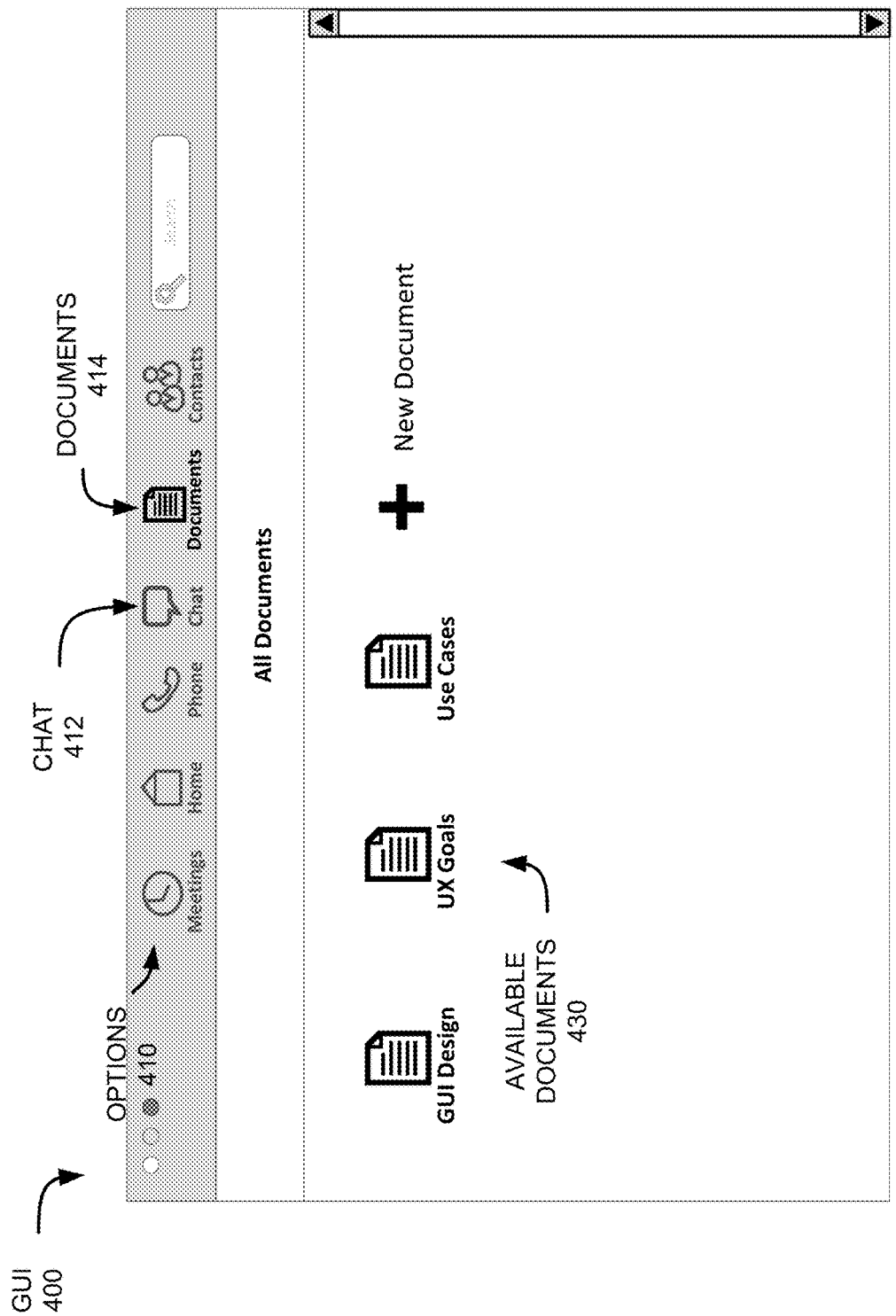

FIG. 4B shows another view of the GUI 400 after the user has selected the documents 414 option. In this example, the client application 360 has communicated with the chat and document management system 314 to obtain a list of all documents accessible by the user. In addition, the GUI 400 allows the user to create a new document.

Figure 4C:
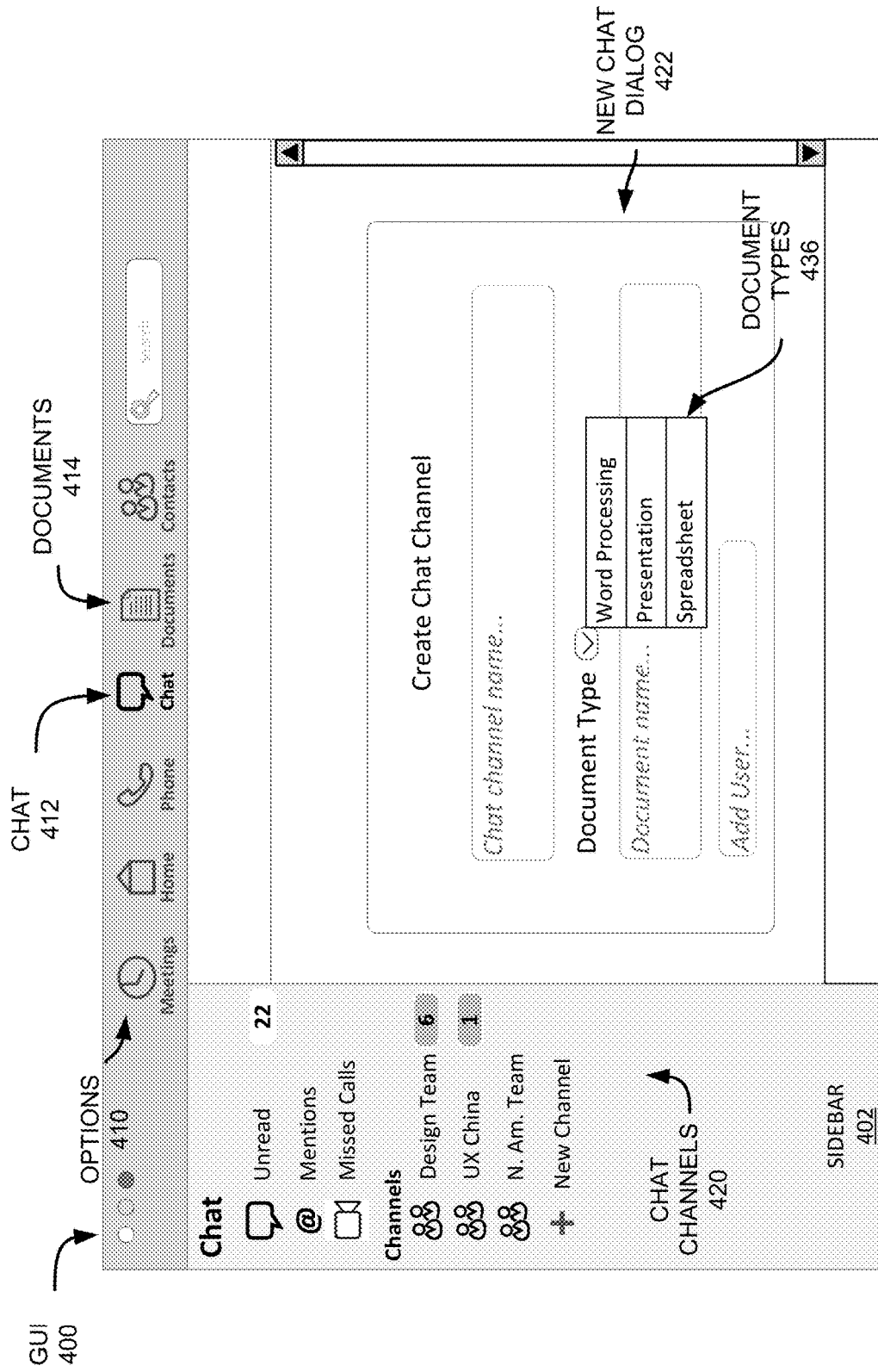

FIG. 4C returns to the chat functionality where the user has selected the option to create a new chat channel. The GUI 400 then presents the user with a new chat dialog window 422, which requests a name for the new chat channel. In addition, because the chat and document management system 314 is configured to create a companion document for new chat channels, the new chat dialog 422 also asks the user to enter a name for the new document and select a document type 436 to create. In this example, the chat and document management system 314 will give the chat channel and the document the same name, if one or the other is not specified.

Figure 4D:
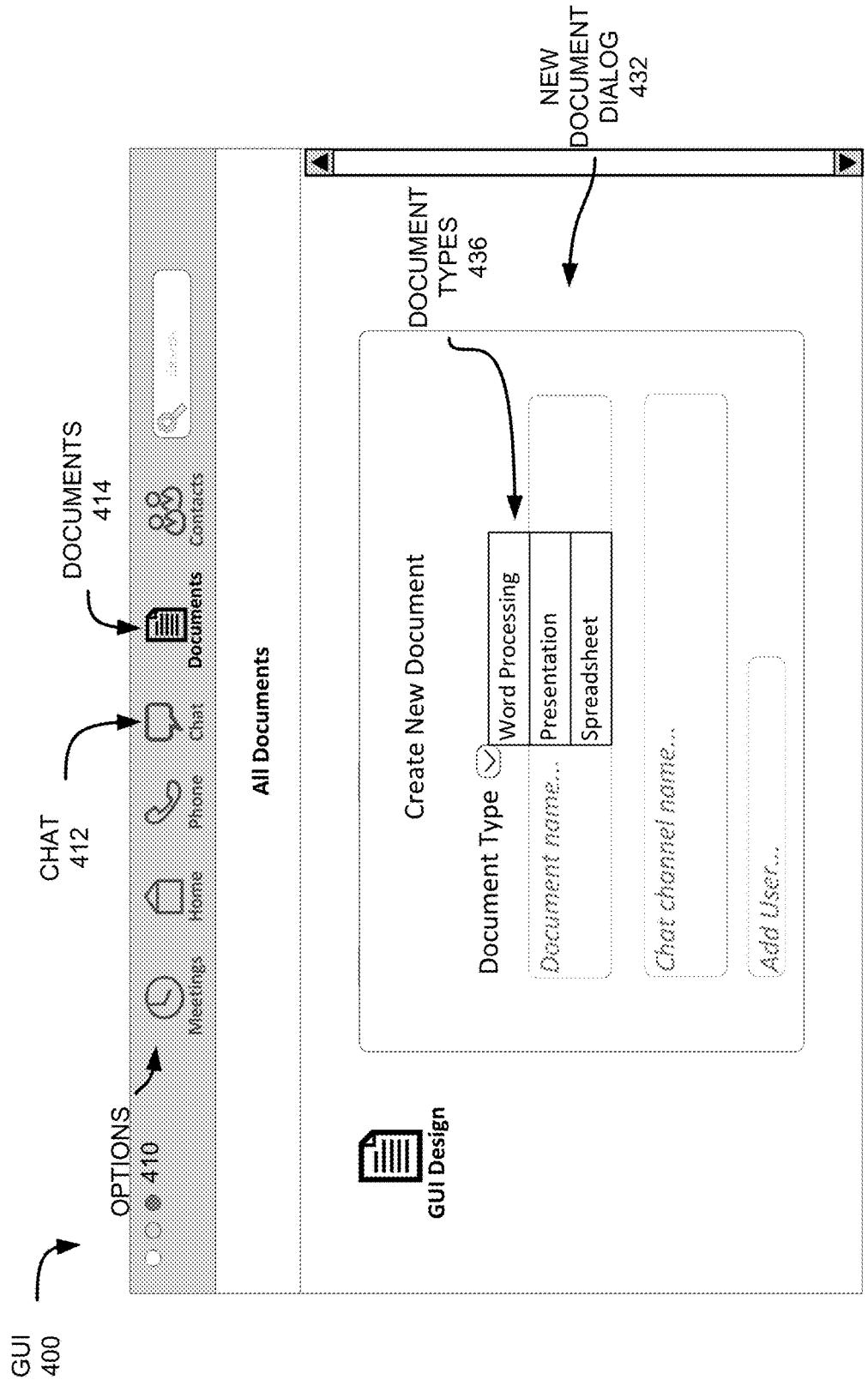

Referring now to FIG. 4D, FIG. 4D shows the document functionality 414 where the user has selected the option to create a new document. The GUI 400 then presents the user with a new document dialog window 432, which requests a name for the new document and a document type 436. In addition, because the chat and document management system 314 is configured to create a companion chat channel for new documents, the new document dialog 432 also asks the user to enter a name for the new chat channel that will be created. As discussed above, in this example, the chat and document management system 314 will give the chat channel and the document the same name, if one or the other is not specified. The user is also given the option to specify one or more other users who may access the document.

Figure 4E:
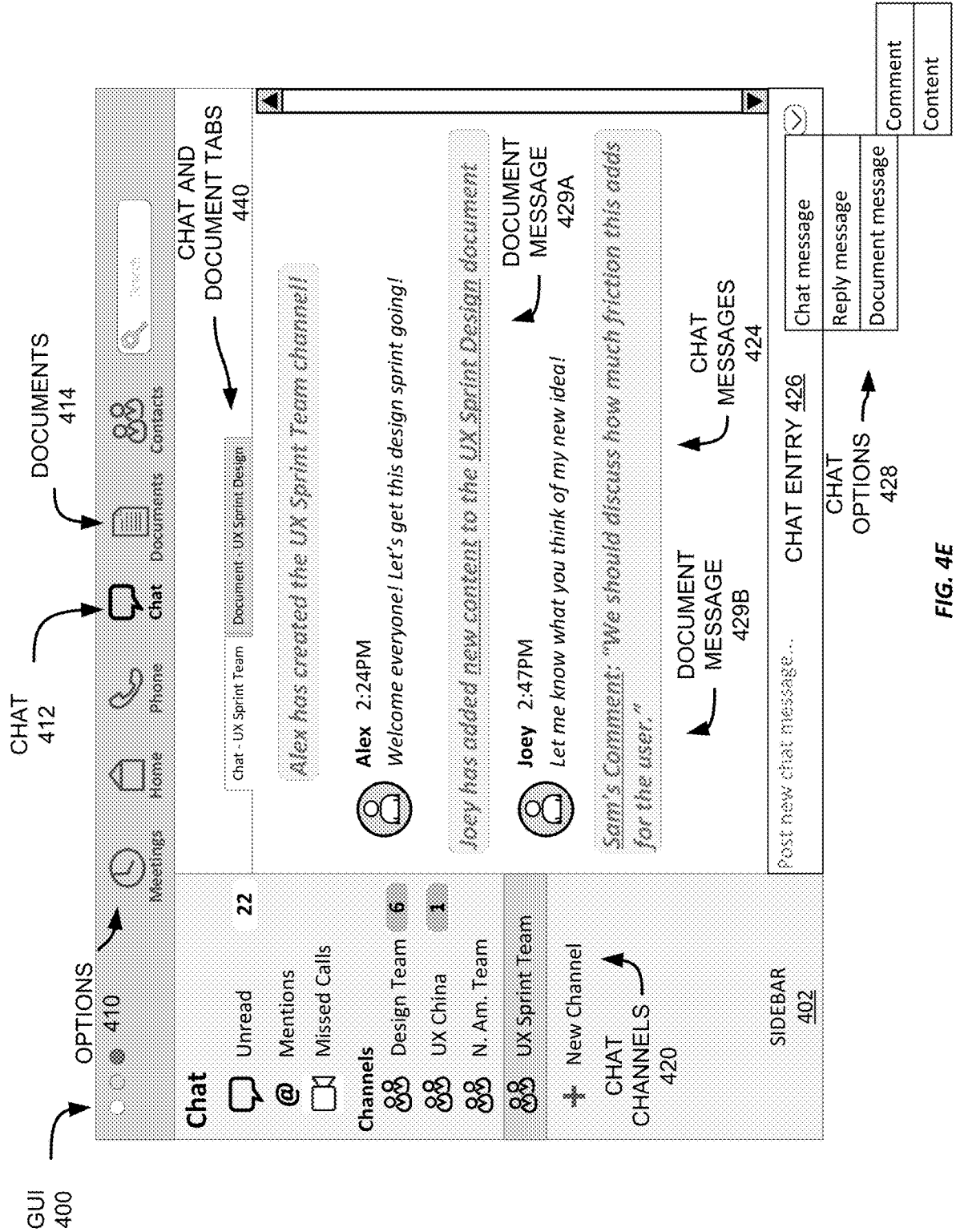

FIG. 4E shows the GUI 400 presenting the user with a view of the chat functionality 412 after creating the new chat channel, called "UX Sprint Team." The user has selected the UX Sprint Team channel, which is highlighted in the sidebar 402. The user is then presented with a view of the chat channel, which shows various chat messages 424 that have been posted to the chat channel. In addition, because the chat channel has a companion document, the GUI 400 adds two chat and document tabs 440 above the chat window to allow the user to easily switch between the chat channel and the companion document.

Within the chat channel, the various chat messages 424 indicate that the chat channel has been created, as well as chat messages posted by different members of the chat channel. In addition, two document messages 429a-b that were generated by the chat and document management system 314. In this case, document message 429a indicates that the user "Joey" has added new content to the UX Sprint Design document. The document message 429a also includes interactive links, indicated by underlining in the document message 429a. One link corresponding to the phrase "new content" will jump a user to the companion document and specifically to the location of the newly added content. In addition, a second link corresponding to the phrase "UX Sprint Design" will jump the user to the companion document but not necessarily to the specific location of the newly added comment. Similarly, the second document message 429b corresponds to a comment added to the companion document by Sam. This message 429b also includes a link to Sam's comment, which will jump the user directly to a view of the document corresponding to Sam's comment.

To post a message to the chat channel, the user may interact with the chat entry 426 region of the GUI 400 to type in a new message. In addition, the user may select the type of chat message to enter using available chat options 428. For example, the user may enter a conventional chat message, but they may also reply to a previously posted message or add a document message to add a comment or content to the document via the chat window.

If the user selects the option to enter a reply message and selects one of the document messages 429a-b, the chat message may be posted to the chat window, but also inserted by the chat and document management system 314 into the companion document as a comment or content. Similarly, if the user selects the option to enter a document message, the content of the chat message may be posted to the chat window, but the chat and document management system 314 may also post the chat message into the companion document as a comment or content. And while chat entry 426 typically involves a user posting a text message, any suitable type of content may be entered or pasted into the chat entry 426 area, which may then be added to the companion document by the chat and document management system 314, as appropriate.

Figure 4F:
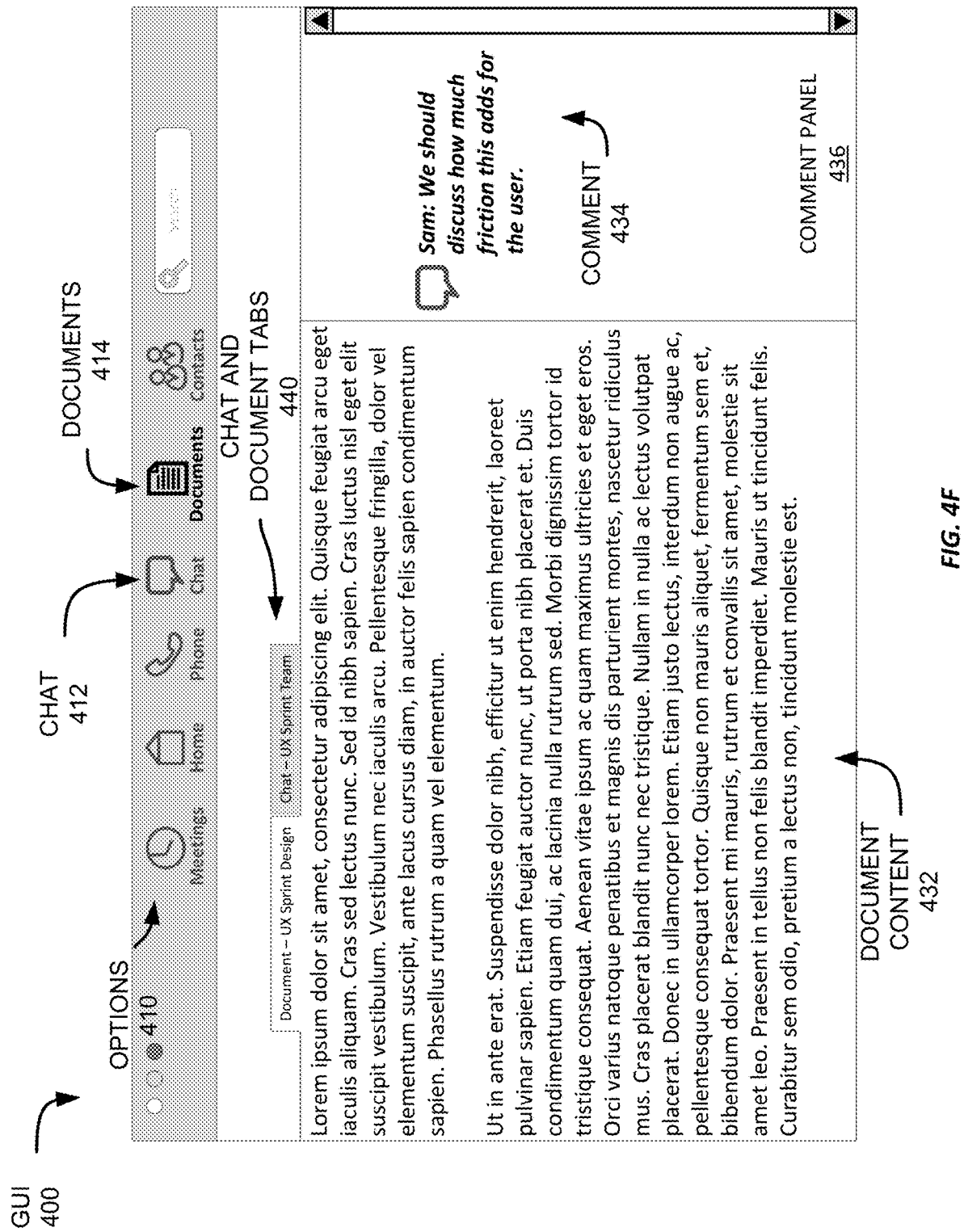

Referring to FIG. 4F, FIG. 4F shows a view of the GUI 400 after the user has selected the document tab from the chat and document tabs 440. After making the selection, the GUI 400 switches to the documents 414 view and provides a view of the content 432 within the document. In addition, the comment 434 added by Sam is visible in a comment panel 436. The user may achieve this same view by selecting one of the interactive links within the document messages 429a-b within the chat window to go to the document itself or the location of the newly added content or Sam's comment. Thus, the user is able to easily navigate between the chat channel and the companion document as needed to collaborate with the rest of their team.

Figure 4G:
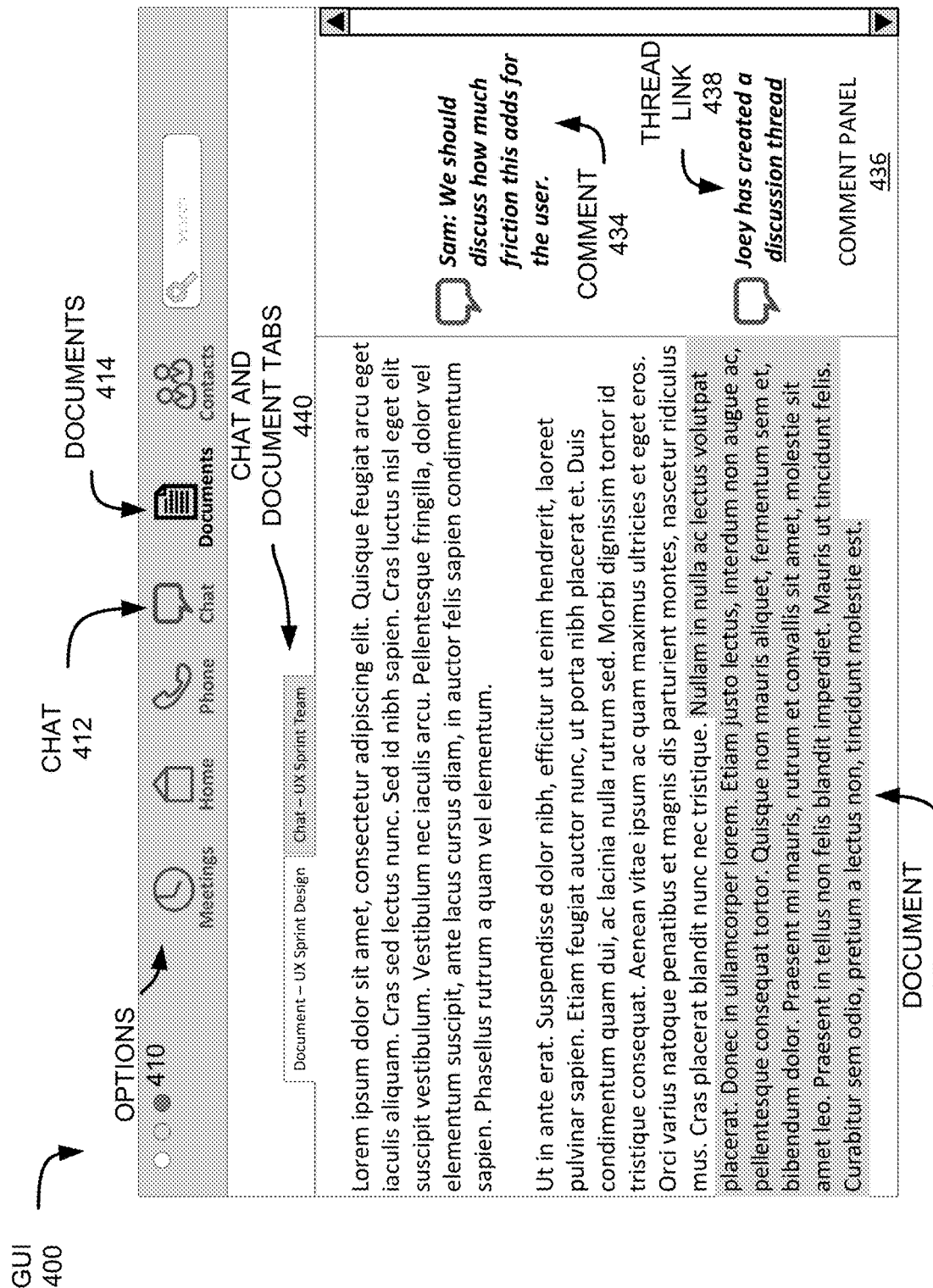

FIG. 4G shows another example of an interaction with the document content 432 in which a user has selected a portion of the content 432 and has selected an option to create a discussion thread in the companion chat channel based on the selection. The comment panel 436 is updated to include a new comment that links to the discussion thread. Such functionality can enable a user to select a specific portion of the document for more extensive, focused discussion.

Figure 4H:
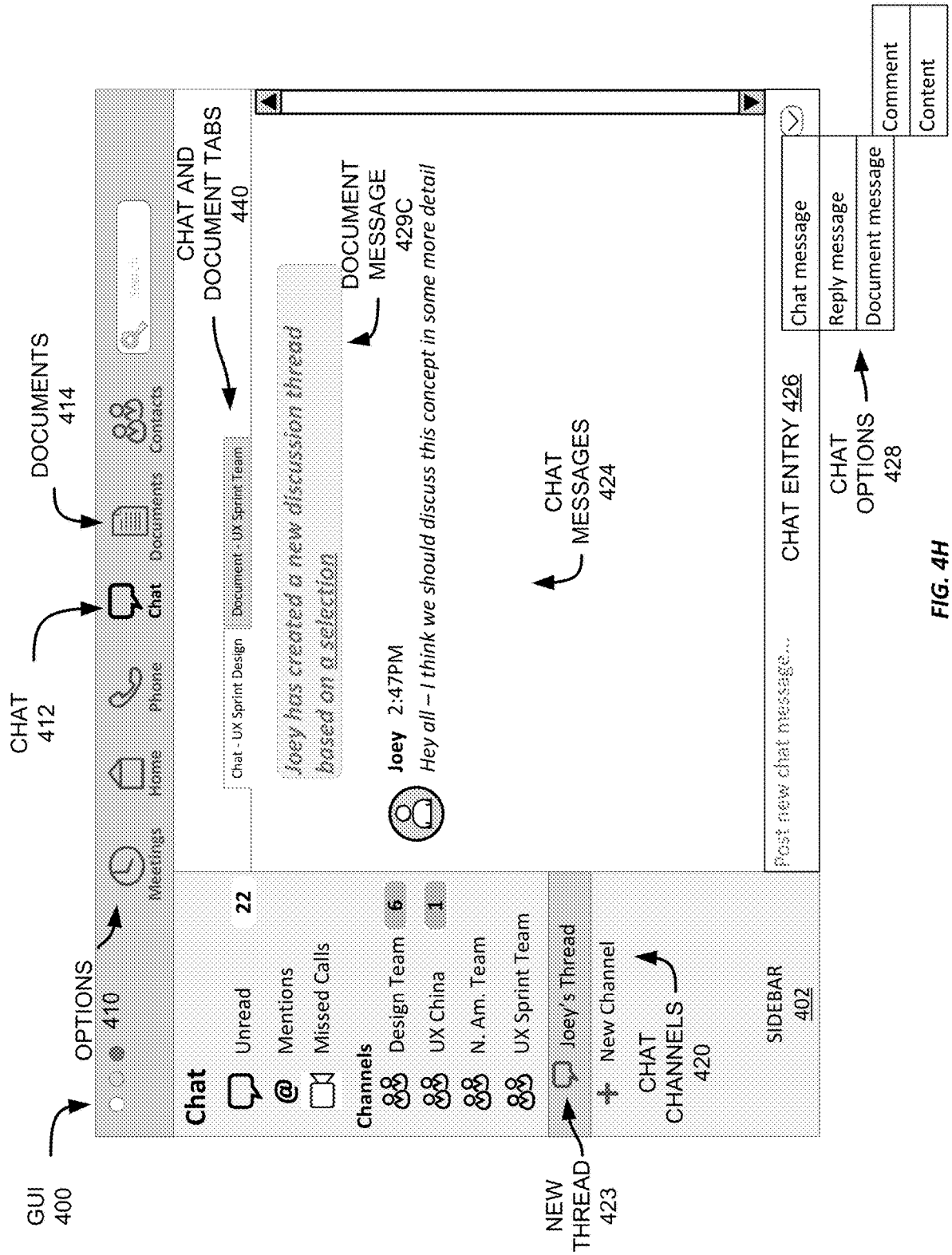

FIG. 4H illustrates the discussion thread created within the UX Sprint Team chat channel. The new thread 423 is shown as being hierarchically dependent from the chat channel and can be separate selected for access. Within the thread, users can post chat messages as discussed above with respect to FIG. 4E. However, because the thread 423 is specifically targeting a particular portion of the document, the discussion may be more focused. Further, to enable users to jump to the relevant portion of the document, a link is provided in a document message 429c to the selected portion of the document.

The discussion above with respect to FIGS. 4A-4H describes a chat channel and a "companion" document. The description of the document as a "companion" is only to illustrate that the chat channel and the document are associated with each other by the chat and document management system 314, not to indicate a hierarchy between the two. It would be just as appropriate to refer to the document and the "companion" chat channel.

Figure 5:
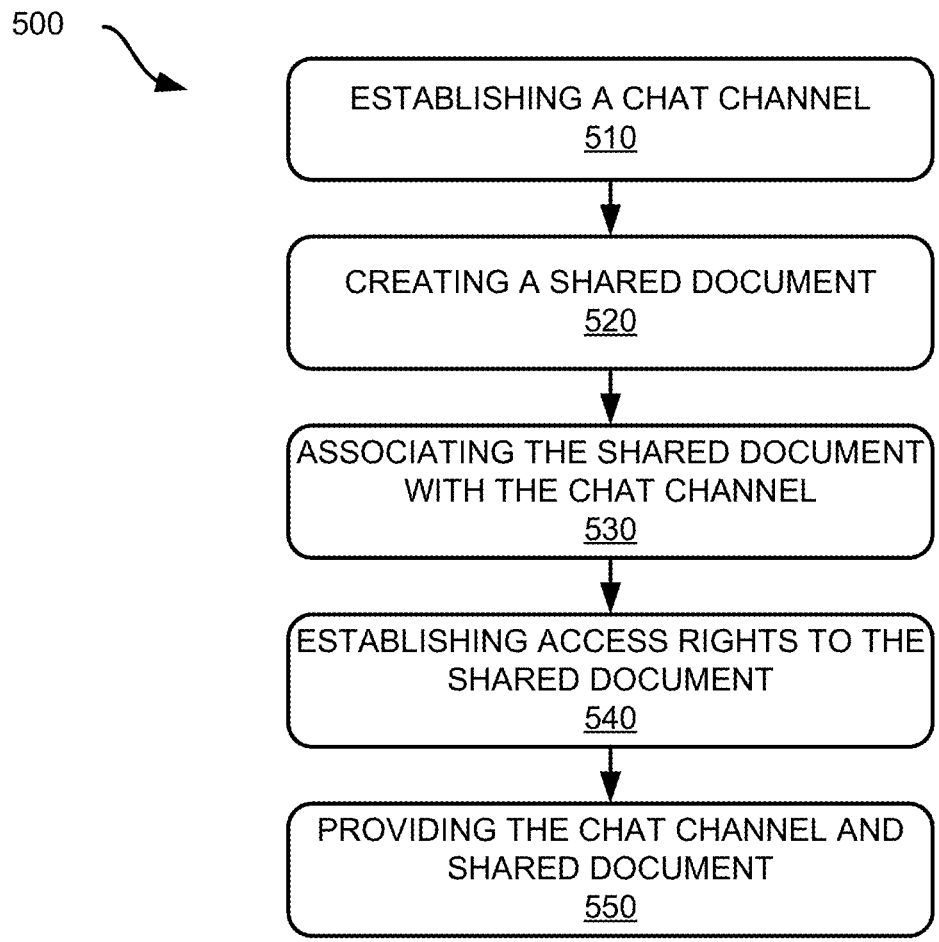
FIGS. 5-6 show example methods for integrating chat channels with document editing.

Referring now to FIG. 5, FIG. 5 shows an example method 500 for integrating chat channels with document editing. The description of the example method 500 will be made with respect to the system shown in FIGS. 3A-3C and the GUI 400 shown in FIGS. 4A-4F; however, any suitable system or GUI according to this disclosure may be employed.

At block 510, the virtual conference provider 310 establishes a chat channel. As discussed above with respect to FIG. 4C, a user may select an option in a GUI 400 to create a new chat channel. In response to the selection, the client application 360 transmits an indication to the virtual conference provider 310 to establish a new chat channel. The virtual conference provider 310 then creates the chat channel and stores configuration and state information about the chat channel in the data store. Configuration information may include parameters such as whether the chat channel is public or private, a list of authorized members of the chat channel, and notification settings for the chat channel. State information may include the messages posted to the chat channel, links from one or more chat messages to a companion document, or a number of members connected to the chat channel at a particular time.

In some examples, the user who creates the chat channel may select one or more other members to have access to the chat channel. For example, a user may select members of the user's team to be members of the chat channel, or one or more other project leaders as a part of a management chat channel. The list of members may be supplied at the time the chat channel is created, at a later time, and the list of members may change over time as new members are added and existing members leave the chat channel.

As discussed throughout this disclosure, creation of a new chat channel initiates the creation of a companion document for the chat channel. An example GUI 400 for such functionality is shown in FIG. 4C; however, any suitable approach may be used. Thus, if a user selects an option to create a new chat channel, a new companion document is created in response to creating the new chat channel.

In this example, the user has selected an option to create a new chat channel, however, as discussed above, a new chat channel is created as a companion when a new document is created, such as shown in FIG. 4D. Thus, while a user may explicitly request to create a new chat channel by selecting an option in a sidebar 402 of a GUI 400, a chat channel may be created in response to a request to create a new document.

At block 520, the virtual conference provider 310 creates a new shared document. As discussed above with respect to FIG. 4D, a user may select an option to create a new document, provide a name for the document, and may select a document type for the new document. The new document is then created and stored in the data store 312. In addition, a request to create a new document also creates a companion chat channel, which may proceed as discussed above with respect to block 510. And while, in this example, the user has selected an option to create a new shared document, as discussed above, a shared document may be created in response to a user selecting an option to create a new chat channel.

As a part of creating the new shared document, the user may select one or more other users to have access rights to the shared document. As with the chat channel, the user may select the other users contemporaneously with creating the new document or at a later time.

At block 530, the virtual conference provider 310 associates the shared document and the chat channel. As discussed above with respect to FIG. 3C, the chat and document management system 314 creates both the chat channel and the shared document and then stores an association between the two in the data store 312. The association provides an indication to the chat and document management system 314 that modifications to the document may cause corresponding messages to be posted to the chat channel, or that messages posted to the chat channel may cause modifications to the documents.

At block 540, the virtual conference provider 310 establishing access rights to the shared document and the chat channel for each user of a plurality of identified users. As discussed above, one or more members may be added to the chat channel over time. Users added to the chat channel are also granted access to the companion document by the chat and document management system 314 based on the association. Similarly, if new users are granted access to the shared document, the chat and document management system 314 also provides them with access to the companion chat channel.

In some examples, different users may have different levels of access to the document or the chat channel. By default, when a new user is added to the chat channel or granted access to the document, the user may have full access rights to post messages to the chat channel and to modify the document. However, access rights may be independently established for the chat channel and the document. For example, a user may be granted access to post and read messages to the chat channel, but only be permitted to read and provide comments in the document, but not to make modifications to the document. The chat and document management system 314 may then enforce these access restrictions even in cases where a user may have sufficient access rights to, for example, post a message to a chat channel that would modify the document or post a comment to the document, but lack access rights to modify the document or post comments. The chat and document management system 314 may allow the user to post the message to the chat channel, but check the user's access rights to the document and not make a corresponding change to the document based on the user's lack of access rights.

At block 550, the virtual conference provider 310 provides the chat channel and shared document to the users granted access. For example, a user may be presented with the new chat channel in the list of chat channels shown in the sidebar 402 of the GUI 400 immediately or the next time the user logs into the client application 360. Similarly, the new document may also appear in the list of available documents 430. In addition to appearing in the respective locations, the GUI 400 may highlight the appearance of the new chat channel and document, such as by displaying a message or flashing the graphical representation of the chat channel or document. Once the users have been provided the chat channel and the document, they may begin interacting with them.

The discussion of the method 500 above has been made in a particular order, however, it should be apparent that the order of steps 510 and 520 is interchangeable depending on whether a user selects an option to create a new chat channel or new document. Further, blocks 540 and 550 may be repeated as often as needed as new users are added to the chat channel or document.

Figure 6:
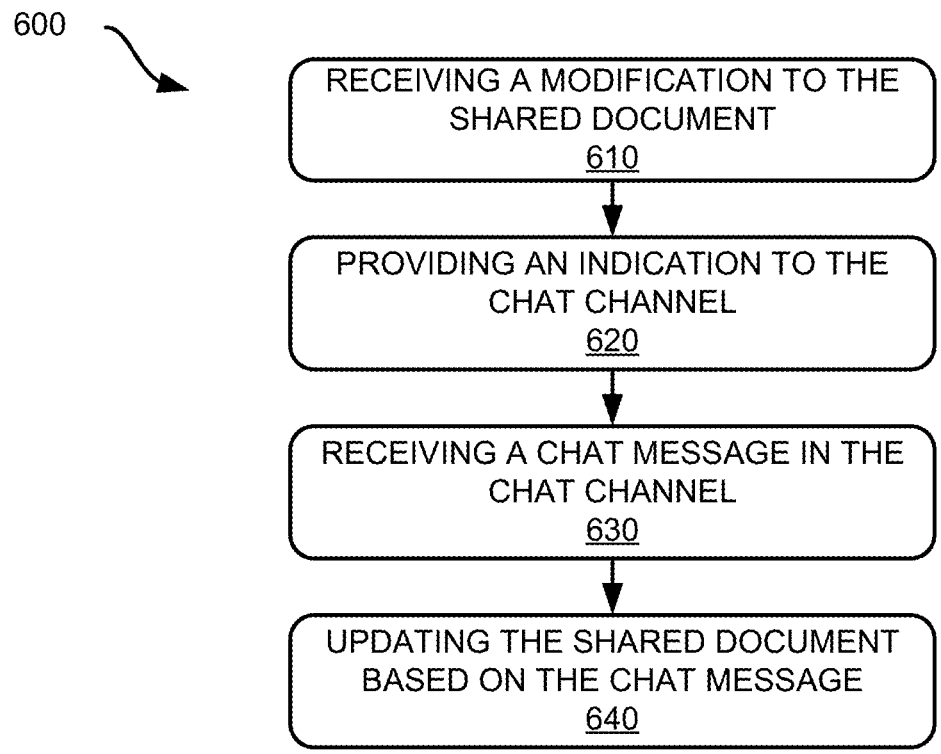

Referring now to FIG. 6, FIG. 6 shows another method for integrating chat channels with document editing. The description of the example method 500 will be made with respect to the system shown in FIGS. 3A-3C and the GUI 400 shown in FIGS. 4A-4F; however, any suitable system or GUI according to this disclosure may be employed.

At block 610, the virtual conference provider 310 receives a modification to the shared document. For example, a user may add new content or revise existing content within a document. The content may be text, graphics, video, or other suitable content. Alternatively, a user may add one or more comments to existing content within the document or may select a portion of the document for discussion.

At block 620, the virtual conference provider 310 provides an indication of the modification to the companion chat channel. When a user modifies a document, they may do so by adding new content or revising existing content. Thus, modifications may occur over a period of time. To provide an indication of the modifications, the chat and document management system 314 may monitor modifications made to the document and, when the user closes the document or is idle for a predetermined period of time (e.g., 5 minutes), the chat and document management system 314 may determine that an indication may be posted to the chat channel. As shown in FIG. 4E, a document message 429*a* may be posted to the chat channel by the chat and document management system 314. Further, the document message 429*a* may include one or more interactive links to the newly added content or to the document itself. If content is added in multiple different locations, separate interactive links may be provided to each portion of content added to the document. Alternatively, the link may only be to the modifications earliest in the document, e.g., page one versus page five, or to the last portion of the document that was modified. A user may then select an interactive link to jump to the specific modification.

In addition to adding content to the document body itself, a user may add comments to a document, as shown in FIG. 4F. The chat and document management system 314 may generate and post a document message 429*b* corresponding to the comment that identifies the modification as a comment, identifies the user who made the comment, and that includes some or all of the content within the content. Alternatively, a document message may only include some of such information. As with document message 429*a*, a document message corresponding to a comment may also include one or more interactive links to allow a user to jump directly to the comment within the shared document. Similarly, if a user selects a portion of the document for discussion, they may create a discussion thread within the chat channel as discussed above with respect to FIG. 4G.

At block 630, the virtual conference provider 310 receives a chat message in the chat channel. As discussed above, a user may post messages to the chat channel. Further, the user may select the type of message to post, such as a reply message, a document message, or a chat message. After receiving the message from a user, the chat and document management system 314 posts the message to the chat channel.

At block 640, the virtual conference provider 310 updates the shared document based on the chat message. Chat messages posted to the chat channel may be used to add content or comments to the companion document, though in some examples, only certain chat messages may be used to do so. For example, a user may select an option to reply to previously posted document message 429*a-b* within the chat channel. A reply to such a document message 429*a-b* may be also added to the document as new content or as a new comment. A reply message may default to being added to the document as a comment, though some examples may allow the user to post the reply message as new content within the document.

Alternatively, the user may select a chat option 428 to post a document message as either a comment or new content within the document. If the user has not specified a portion of the document to add the comment or content, new comments may be added to the beginning of the document, while new content may be added to the end of the document by default. Alternatively, if the user has been working in the document, the new document message may be posted at a cursor position associated with the user within the document. Still other approaches may be employed as well.

It should be appreciated that blocks 610-620 and 630-640 may be executed independently of each other. Thus, a modification to a document may cause the chat and document management system 314 to post a document message to the chat channel, independently of whether any user posts a chat message to the chat channel that will be incorporated into the document as new content or a new comment.

Figure 7:
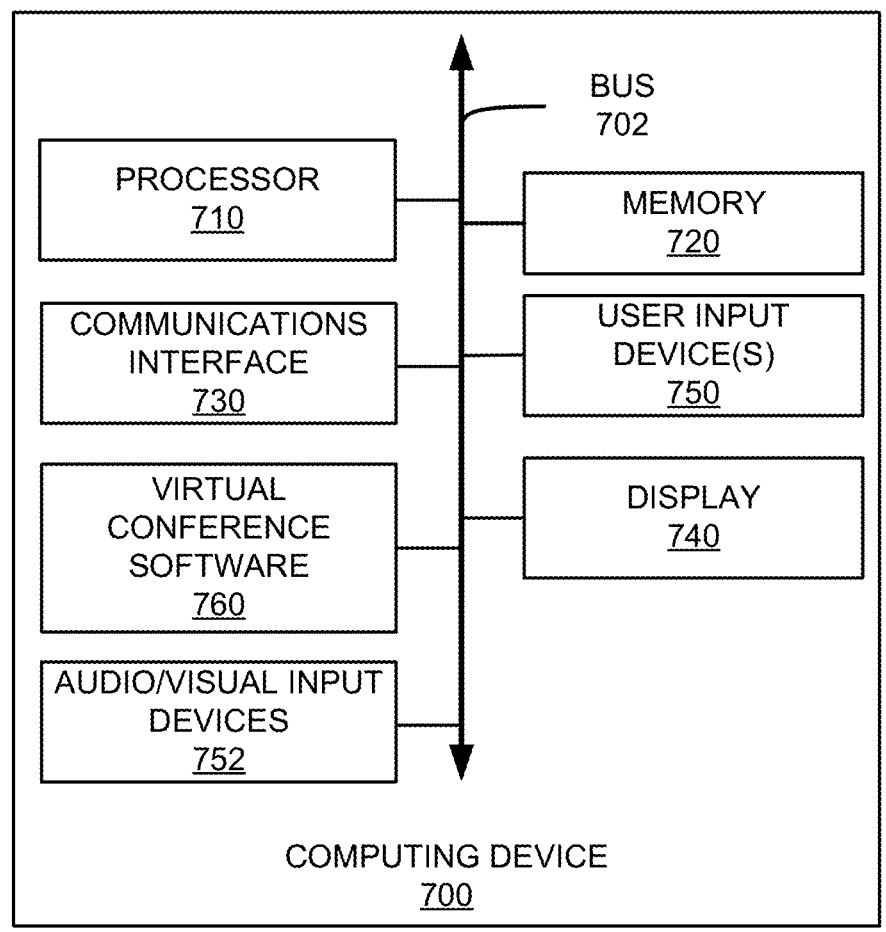
FIG. 7 shows an example computing device suitable for systems and methods for integrating chat channels with document editing.

Referring now to FIG. 7, FIG. 7 shows an example computing device 700 suitable for use in example systems or methods for integrating chat channels with document editing according to this disclosure. The example computing device 700 includes a processor 710 which is in communication with the memory 720 and other components of the computing device 700 using one or more communications buses 702. The processor 710 is configured to execute processor-executable instructions stored in the memory 720 to perform one or more methods for integrating chat channels with document editing according to different examples, such as part or all of the example methods 500-600 described above with respect to FIGS. 5-6.

The computing device, in this example, also includes one or more user input devices 750, such as a keyboard, mouse, touchscreen, microphone, etc., to accept user input. The computing device may also include one or more audio or visual input devices, such as a camera and a microphone, or one or more ports to receive audio or video feeds from an external device, such as a camera, video player, etc. The computing device 700 also includes a display 740 to provide visual output to a user. In some examples, the computing device 700 may operate as a client device, but computing devices according to FIG. 7 may be employed by the virtual conference provider 310 and the virtual conference software 760 may provide a chat and document management system 314.

While some examples of methods and systems herein are described in terms of software executing on various machines, the methods and systems may also be implemented as specifically-configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random-access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, that may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

The which is claimed is:

1. A method comprising:
   receiving, by a virtual conference provider, a request to create a chat channel;
   in response to receiving the request:
      establishing, by the virtual conference provider, the chat channel;
      creating, by the virtual conference provider, a shared new document;
      integrating, by the virtual conference provider, the shared new document and the chat channel, the integrating enabling sharing of content by the virtual conference provider from the shared new document to the chat channel and from the chat channel to the shared new document;
      establishing, by the virtual conference provider, access rights to the shared new document and the chat channel for each user of a plurality of identified users; and
      providing, by the virtual conference provider, the chat channel and the shared new document to each user of the plurality of identified users;
   receiving, by the virtual conference provider, a modification to the shared new document; and
   providing, by the virtual conference provider, an indication of the modification as a message in the chat channel.

2. The method of claim 1, further comprising:
   receiving, by the virtual conference provider, a selection of the indication; and
   jumping, by the virtual conference provider, to a corresponding location in the shared new document.

3. The method of claim 1, wherein:
   receiving the modification comprises receiving a comment in the shared new document; and
   providing the indication of the modification comprises publishing the comment in the chat channel.

4. The method of claim 1, further comprising:
   receiving, by the virtual conference provider, a selection of a portion of the shared new document; and
   creating, by the virtual conference provider, a discussion thread within the chat channel associated with the selected portion of the shared new document.

5. A system comprising:
   a non-transitory computer-readable medium;
   a communications interface; and
   one or more processors communicatively coupled to the non-transitory computer-readable medium and the communications interface, the one or more processors configured to execute processor-executable instructions stored in the non-transitory computer-readable medium to:
      receive a request to create a chat channel;
      in response to receiving the request:
         establish the chat channel;
         create a shared new document;

integrate the shared new document and the chat channel, the integrating enabling sharing of content from the shared new document to the chat channel and from the chat channel to the shared new document;

establish access rights to the shared new document and the chat channel for each user of a plurality of identified users; and provide the chat channel and the shared new document to each user of the plurality of identified users;

receive a modification to the shared new document; and provide an indication of the modification as a message in the chat channel.

6. The system of claim 5, wherein the one or more processors are configured to execute further processor-executable instructions stored in the non-transitory computer-readable medium to:

receive a selection of the indication; and jump to a corresponding location in the shared new document.

7. The system of claim 5, wherein:

the modification comprises a comment in the shared new document; and the indication of the modification comprises the comment.

8. The system of claim 5, wherein the one or more processors are configured to execute further processor-executable instructions stored in the non-transitory computer-readable medium to:

receive a selection of a portion of the shared new document; and create a discussion thread within the chat channel associated with the selected portion of the shared new document.

9. A non-transitory computer-readable medium comprising processor-executable instructions configured to cause a processor to:

receive a request to create a chat channel;

in response to receiving the request:

establish the chat channel;

create a shared new document;

integrate the shared new document and the chat channel, the integrating enabling sharing of content from the shared new document to the chat channel and from the chat channel to the shared new document;

establish access rights to the shared new document and the chat channel for each user of a plurality of identified users;

provide the chat channel and the shared new document to each user of the plurality of identified users;

receive a modification to the shared new document; and provide an indication of the modification as a message in the chat channel.

10. The non-transitory computer-readable medium of claim 9, further comprising processor-executable instructions configured to cause the one or more processors to:

receive a selection of the indication; and jump to a corresponding location in the shared new document.

11. The non-transitory computer-readable medium of claim 9, wherein:

the modification comprises a comment in the shared new document; and the indication of the modification comprises the comment.

* * * * *